United States Patent [19]

Matsumoto

[11] 4,384,244
[45] May 17, 1983

[54] TORQUE CONTROL SYSTEMS OF INDUCTION MOTORS

[75] Inventor: Mitsuo Matsumoto, Kikubunji, Japan

[73] Assignee: Toshiba Kikai Kabushiki Kaisha, Tokyo, Japan

[21] Appl. No.: 171,645

[22] Filed: Jul. 23, 1980

[30] Foreign Application Priority Data

Jul. 28, 1979 [JP] Japan .................................. 54-96379

[51] Int. Cl.³ .............................................. H02P 5/40
[52] U.S. Cl. ...................................... 318/803; 318/811
[58] Field of Search ............... 318/803, 811, 867, 798, 318/812, 810

[56] References Cited

U.S. PATENT DOCUMENTS

| | | | |
|---|---|---|---|
| 3,394,297 | 7/1968 | Risberg | 318/798 |
| 3,983,463 | 9/1976 | Nabae et al. | 318/803 |
| 4,028,599 | 6/1977 | Zanki et al. | 318/803 |
| 4,267,499 | 5/1981 | Kurosawa | 318/807 |
| 4,272,715 | 6/1981 | Matsumoto | 318/807 |

*Primary Examiner*—David Smith, Jr.
*Attorney, Agent, or Firm*—Koda and Androlia

[57] ABSTRACT

In a torque control system of an induction motor having m phase stator windings and P poles there are provided a torque instructor and a phase n voltage $V_{ns}$ generator responsive to a torque instruction given by the torque instructor to calculate the phase n voltage according to the following equation.

$$V_{ns} = r_s I_o \cos\left(\phi - \frac{2(n-1)}{m}\pi\right) - \left(l_m I_o \frac{d\phi}{dt} + r_s I_2\right) \sin\left(\phi - \frac{2(n-1)}{m}\pi\right)$$

where $$\phi = \frac{P}{2}\theta + \frac{r_r}{l_r I_o}\int I_2 dt \text{ (radian)},$$

m: number of phases,
n: 1, 2, ..., m,
P: number of poles,
$I_o$: constant exciting current (ampere),
$r_s$, $r_r$, $l_r$ and $l_m$: constants inherent to the induction motor,
$\theta$: rotor rotational angle (radian) of the induction motor, and
$I_2$: instructed rotor current (ampere) proportional to an instructed torque.

7 Claims, 16 Drawing Figures

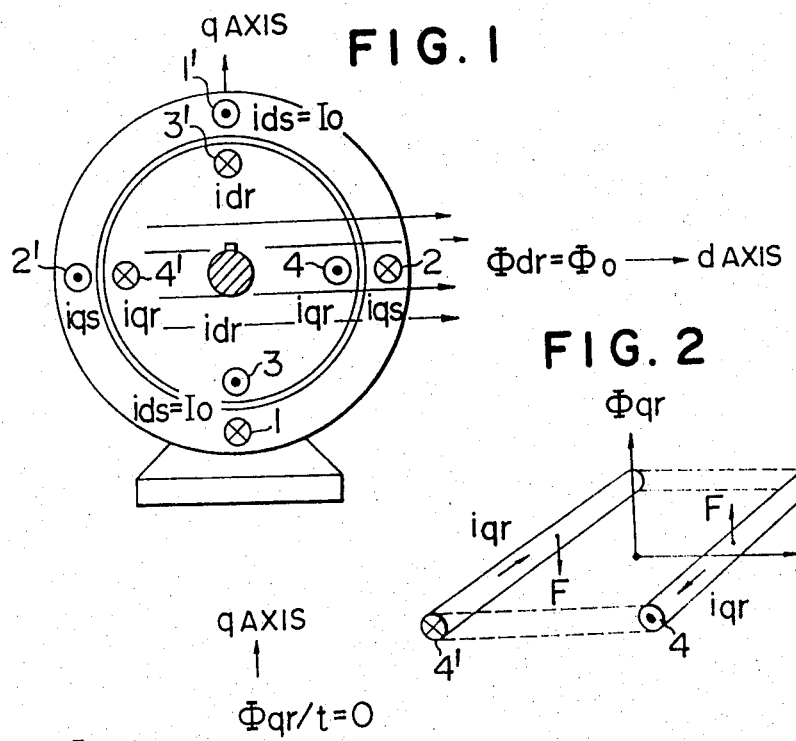
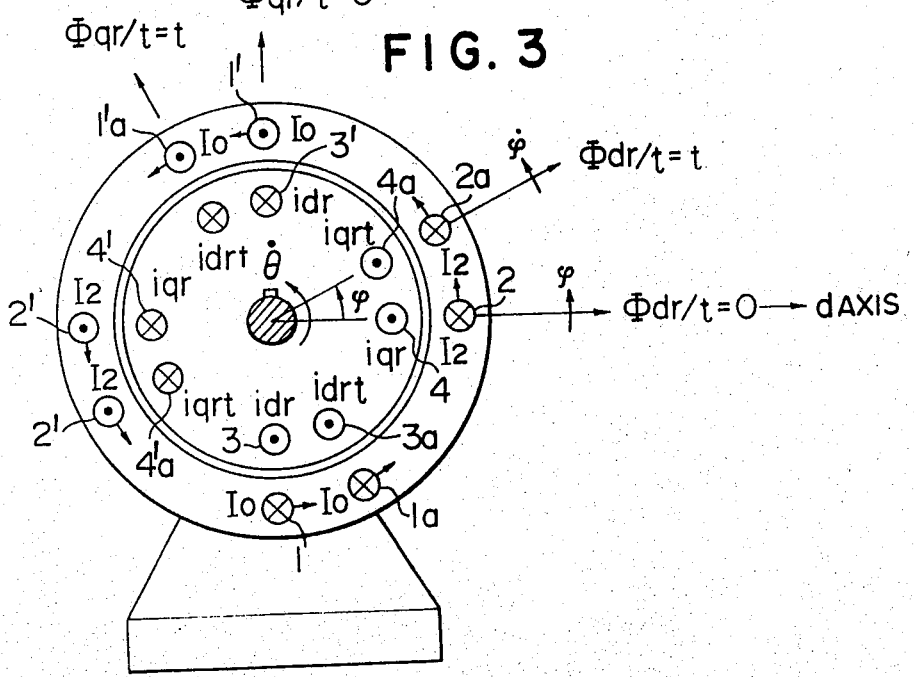

TORQUE CONTROL SYSTEMS OF INDUCTION MOTORS

BACKGROUND OF THE INVENTION

This invention relates to a torque control system of an induction motor.

In most cases, DC shunt motors have been used in such field requiring quick response characteristics as position control apparatus and speed control apparatus. Because a quick response control system can be realized since the output torque is proportional to the armature current and since flow of the armature current immediately produces the output torque, and because a control system intended by a designer can readily be realized with a simple linear automatic control theory.

Where induction motors abundantly used as constant speed motors can be used in these control systems there arises many advantages over direct current motors. For example, as no brush is used not only maintenance is easy but also electric spark, electric noise and mechanical fault can be avoided. Further, as no commutator is used problems of commutation do not occur so that large current high speed operation is possible. Moreover, induction motors can be manufactured to be dust proof and explosion proof with small and low cost.

Among the prior art induction motor control systems is included so-called V/f constant control system in which the primary voltage and the primary frequency of the motor are made proportional to the number of rotations. With this control system, however, it is difficult to immediately produce an instructed torque thus failing to realize a quick response control system, and to produce torque according to linear automatic linear control theory.

SUMMARY OF THE INVENTION

Accordingly, it is the principal object of this invention to provide an improved control system of an induction motor which can immediately generate an output torque precisely proportional to an instructed value according to a linear automatic control theory similar to that of a DC motor.

Another object of this invention is to provide an improved system for controlling torque, speed and a rotor angular position of an induction motor according to a linear automatic control theory.

According to this invention there is provided a torque control system of an induction motor having m phase windings and P poles, comprising means for producing a predetermined torque instruction, and means responsive to the torque instruction for generating and applying a phase n voltage $V_{ns}$ expressed by the following equation to the stator windings of the induction motor to cause it to produce a torque corresponding to the torque instruction.

$$V_{ns} = r_s I_o \cos\left(\phi - \frac{2(n-1)}{m}\pi\right) - \left(l_m I_o \frac{d\phi}{dt} + r_s I_2\right) \sin\left(\phi - \frac{2(n-1)}{m}\pi\right)$$

where $$\phi = \frac{P}{2}\theta + \frac{r_r}{l_r I_o} \int I_2 dt \text{ (radian)},$$

m: number of phases equal to 2 or more,
n: 1, 2, . . . m,
P: number of poles of the induction motor,
$I_o$: constant exciting current of the stator windings (ampere),
$r_s$, $r_r$, $l_r$ and $l_m$: constants inherent to the induction motor,
$\theta$: rotor rotating angle (radian) of the induction motor, and
$I_2$: instructed rotor current (ampere) corresponding to the torque instruction.

According to modified embodiments there are provided a device for controlling the phase n voltage to be equal to a permissible maximum value and a device for producing a permissible maximum voltage which makes equals the voltage $V_{ns}$ to be equal to the permissible maximum voltage.

BRIEF DESCRIPTION OF THE DRAWINGS

In the accompanying drawings:

FIG. 1 is a diagrammatic cross-sectional view of a two phase two pole induction motor to which the present invention is applicable;

FIG. 2 is a diagram useful to explain the operation of the motor shown in FIG. 1;

FIG. 3 is a diagrammatic cross-sectional view of a two phase two pole induction motor corresponding to FIG. 1;

DESCRIPTION OF THE PREFERRED EMBODIMENTS

Figure 4:
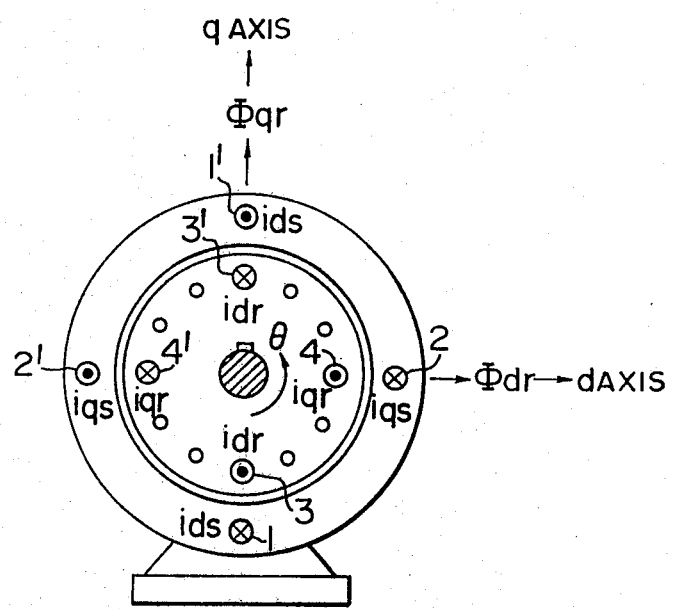
FIG. 4 is a diagrammatic cross-sectional view useful to explain the principle of this invention in accordance with FIG. 1.

To have better understanding of this invention the principle of a torque control of an induction motor according to this invention will firstly be described.

For simplifying the description, a two phase two pole induction motor will be described. FIG. 1 shows a cross-sectional view of a squirrel cage two phase two pole induction motor. The motor is represented by a q axis and a d axis of rectangular coordinates and cross-sections of one stator winding 1-1' and the other stator winding 2-2' orthogonal thereto are shown. When a constant exciting current $i_{ds}=I_o$ is passed through the winding 1-1', the magnetic flux $\Phi_{dr}$ induced in the rotor along d axis has a constant value $\Phi_o$. In order to cause the motor to produce a constant torque under this condition when the current $i_{qs}$ flowing through the stator winding 2-2' is varied from zero to a constant value $I_2$, the flux $\Phi_{qr}$ in the direction of q axis in the rotor shown in FIG. 2 varies thereby inducing voltage in the rotor winding 4-4'. This induced voltage passes current $i_{qr}$ through rotor winding 4-4' short circuited by a rotor winding resistance $r_r$. At this time, since the flux $\Phi_{qr}$ does not link the rotor winding 3-3' no voltage would be induced in the winding 3-3', and current $i_{dr}$ becomes zero so that flux $\Phi_{dr}$ maintains a value $\Phi_o$.

Assume now that the rotor is not rotating the following equations hold.

$$\Phi_{qr}=l_m i_{qs}-l_r i_{qr} \quad (1)$$

$$d\Phi_{qr}/dt=r_r i_{qr} \quad (2)$$

where $l_m$ represents the mutual inductance H betwen the stator and rotor windings, and $l_r$ the self inductance of the rotor winding.

From equations (1) and (2) we can obtain the following equation.

$$l_r \frac{di_{qr}}{dt} + r_r i_{qr} = l_m \frac{di_{qs}}{dt} \quad (3)$$

When the current $i_{qs}$ varies from zero to $I_2$ at a time $t=0$ the current $i_{qr}$ is shown by the following equation derived from equation (3).

$$i_{qr} = \frac{l_m}{l_r} I_2 e^{-\frac{r_r}{l_r} \cdot t} \quad (4)$$

Thus, at $t=0$ current $i_{qrt}=0=(l_m/l_r)I_2$ flows through the winding 4-4', and the flux $\Phi_o$ orthogonal to the winding 4-4' produces a force $F=K_F\Phi_o(l_m/l_r)I_2$ in the direction of rotation shown in FIG. 2, where $K_F$ represents a constant coefficient.

Under this condition the current $i_{qr}$ decreases with time according to equation (4). Where it is desired to maintain the force F at a constant value $F=K_F\Phi_o(l_m/l_r)I_2$, that is to maintain the torque at a constant value it is necessary to always maintain the current $i_{qr}$ at a constant value of $i_{qr}=(l_m/l_r)I_2$. In other words, it is necessary to maintain the flux $\Phi_o$ orthogonal to current $i_{qr}$.

To hold the equation $i_{qr}=(l_m/l_r)I_2$, the stator windings 1-1' and 2-2' are rotated at a constant speed $\dot\phi$ (rad./sec) starting from a time $t=0$ while maintaining equal the currents $I_o$ and $I_2$ flowing through the stator windings 1-1' and 2-2'. (Actually, the stator windings 1-1' and 2-2' are not rotated, but for the purpose of description, it is assumed herein that they are rotated). At time t these windings are rotated by an angle $\phi$ to the positions 1a-1a' and 2a-2a'. At t=0, flux $\Phi_{dr}/t=0$ having a magnitude $\Phi_o$ crosses the rotor winding 4-4' at the constant speed $\dot\phi$ to induce voltage $\dot\phi\Phi_o$ therein. This induced voltage $\dot\phi\Phi_o$ passes current $i_{qr}\dot\phi\Phi_o/r_r$ through the winding 4-4'.

The speed $\dot\phi$ which satisfies the following equation (5) is determined so that current $i_{qr}$ becomes equal to $(l_m/l_r)\cdot I_2$.

$$\frac{\dot\phi\Phi_o}{r_r} = \frac{l_m}{l_r} I_2 \quad (5)$$

$$\dot\phi = \frac{l_m}{l_r} \frac{r_r}{\Phi_o} I_2$$

At time t=0 since $i_{qr}=(l_m/l_r)I_2$ and the current $i_{qs}$ flowing through the stator winding 2-2' is equal to $I_2$, from equation (1) $\Phi_{qr}/t=0$ so that no voltage is induced in the rotor winding 3-3' and $i_{dr}=0$ with the result that the magnitude of the flux $\phi_{dr}/t=0$ remains at $\phi_o$.

Consider now that the stator windings are rotated at a speed $\dot\phi$ starting from t=0 to reach positions 1a-1a' and 2a-2a' shown in FIG. 3 at time t, the constant exciting current $I_o$ flowing through the stator winding 1a-1a' induces a flux vector $\Phi_{dr}/t=t$ in the direction of the winding 2a-2a' and having a magnitude $\Phi_o$ and an angle $\phi$ as shown in FIG. 3. As this flux crosses the rotor winding 4a-4a' in the plane of the winding 2a-2a' at a speed $\dot\phi$ voltage $\dot\phi\Phi_o$ is induced in the rotor winding, typically 4a-4a'. Although this flux $\Phi_{dr}/t=t$ induces voltages in windings 3-3', 4-4' and other squirrel cage rotor windings the direction of a resultant vector of these voltages lies in the direction of winding 4a-4a', so that it can be considered that the voltage is induced only in the rotor winding 4a-4a' and not in other rotor windings. Due to this induced voltage current $i_{qrt}=-\dot\phi\Phi_o/r_r$ flows through the rotor winding 4a-4a'. It can be noted that this current $i_{qrt}$ is equal to $(l_m/l_r)I_2$ from equation (5) and in this case too the flux $\Phi_{dr}/t=t$ linking the winding 4a-4a' produces a force $F=K_F\Phi_o(l_m/l_r)I_2$. At this time, the current $I_2$ flowing through the stator winding 2a-2a' and the current $i_{qrt}$ flowing through the rotor winding 4a-4a' have the same magnitude $(i_{qrt}=(l_m/l_r)I_2\approx I_2)$, whereas in an ordinary induction motor $l_m\approx l_r)$ and $l_m$ and $l_r$ have opposite directions, so that the rotor current $i_{drt}$ of the rotor winding 3a-3a' in the same plane as the stator winding 1a-1a' becomes zero while the flux $\Phi_{dr}/t=t$ still maintains its magnitude $\Phi_o$.

Since above described relations hold at any time t the output torque $T_e$ of the motor is held always constant as given by the following equation.

$$T_e = K_T \Phi_o \frac{l_m}{l_r} I_2 \quad (6)$$

where $K_T$ represents a constant.

As can be noted from the foregoing description, the current $I_o$ creates flux $\Phi_{dr}/t=t$, and the rotor current $i_{qrt}$ on the axis $\Phi_{dr}/t=t$ has the same magnitude as the current $I_2$ flowing through the stator winding 2a-2a' but opposite direction. This is equivalent to the fact that current $I_o$ corresponds to the exciting current of a DC motor and current $I_2$ to the armature current thereof. Thus, an induction motor can produce a torque just in the same manner as in a DC motor.

Although the above description relates to a case wherein the rotor is not rotating (number of rotations of the rotor $\dot\theta=0$), when the rotor is rotating at a speed $\dot\theta$ (rad/sec) the same consideration as shown in FIG. 3 may be made when one considers that the d axis and the q axis are fixed with respect to the rotor. In this case, the value of $\phi$ in equation (5) can be expressed by rectangular coordinates with axes d and q fixed relative to the rotor. With a static rectangular coordinates (on the stator), since $$\dot\phi(\text{on stator}) = \dot\phi(\text{on rotor}) + \dot\theta(\text{on stator})$$

the stator windings 1-1' and 2-2' should be rotated at a speed given by the following equation.

$$\dot\phi \text{ (on stator)} = \dot\theta \text{ (on stator)} + \frac{l_m r_r}{l_r \Phi_0} I_2 \tag{7}$$

Although in the foregoing description, it was assumed that $\dot\theta$ and $I_2$ are constant, it can be noted thta these values are not required to be always constant. Thus, the output torque $T_e$ of the induction motor is given by equation (6) so long as equation (7) holds regardless of the manner of varying $\dot\theta$ and $I_2$ with time. Although in the foregoing description it was assumed that the stator windings 1-1' and 2-2' shown in FIG. 3 rotate, in an actual induction motor these windings are held stationary in the positions shown in FIG. 1. Where it is necessary to position the stationary windings at the positions of the windings 1a-1a' and 2a-2a' shown in FIG. 3 the currents $I_0$ and $I_2$ flowing through these windings are decomposed into a d axis component $i_{ds} = I_0 \cos\phi - I_2 \sin\phi$ and a q axis component $i_{qs} = I_0 \sin\phi + I_2 \cos\phi$ and these component currents are passed through the stator windings 1-1' and 2-2'. Thus, it is necessary to make currents $i_{ds}$ and $i_{qs}$ as follows.

$$\left. \begin{array}{l} i_{ds} = I_0 \cos\phi - I_2 \sin\phi \\ i_{qs} = I_0 \sin\phi + I_2 \cos\phi \end{array} \right\} \tag{8}$$

Determination of the voltage control equations of an induction motor

The manner of controlling the stator voltage of the induction motor for practicing the theory described above will now be discussed.

FIG. 4 is a cross-sectional view of a two phase induction motor identical to that shown in FIG. 1 in which mutually orthogonal stator windings 1-1' and 2-2' are shown. Let us denote the current flowing through the winding 1-1' for creating flux $\Phi_{dr}$ in the direction of d axis by $i_{ds}$ and the current flowing through the windng 2-2' for creating flux $\Phi_{qr}$ in the direction of q axis. The directions of these currents are designated by dots and crisscrosses.

Due to the magnetic induction of the stator current $i_{ds}$ and $i_{qs}$, rotor current flows through all squirrel cage rotor windings shown in FIG. 4. For simplifying the description, only two rotor windings, i.e. a winding 3-3' in the direction of the q axis and a winding 4-4' in the direction of the d axis are considered and it is assumed that the rotor current can be expressed by reactangular coordinates of the current $i_{dr}$ flowing through the rotor winding 3-3' and of the current $i_{qr}$ flowing through the rotor winding 4-4'.

Figure 5:
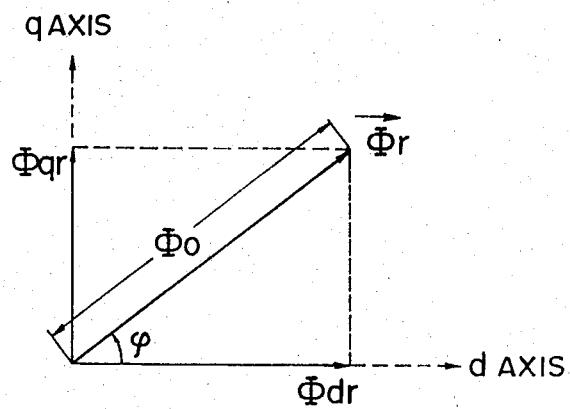
FIG. 5 is a vector diagram useful to explain the principle of operation of this invention.

The currents $i_{ds}$ and $i_{dr}$ respectively flowing through the windings 1-1' and 3-3' shown in FIG. 4 create flux $\Phi_{dr}$ in the rotor along d axis as shown in FIG. 5, while currents $i_{qs}$ and $i_{qr}$ respectively flowing through windings 2-2' and 4-4' create flux $\Phi_{qr}$ in the direction of q axis.

The fluxes $\Phi_{dr}$ and $\Phi_{qr}$ are given by $$\left. \begin{array}{l} \Phi_{dr} = l_m i_{ds} - l_r i_{dr} \\ \Phi_{dr} = l_m i_{qs} - l_r i_{qr} \end{array} \right\} \tag{9}$$

Assume now that the rotor is rotating in a direction shown in FIG. 4 at a speed of $\dot\theta$ (rad/sec), the following equations hold because windings 3-3' and 4-4' are short circuited through rotor winding resistance $r_r$.

$$\left. \begin{array}{l} \dot\theta \Phi_{qr} + \dfrac{d\Phi_{dr}}{dt} = r_r i_{dr} \\ -\dot\theta \Phi_{dr} + \dfrac{d\Phi_{qr}}{dt} = r_r i_{qr} \end{array} \right\} \tag{10}$$

Suppose now that the fluxes $\Phi_{dr}$ and $\Phi_{qr}$ represent components along d and q axes of a rotating flux vector $\Phi_r$ shown in FIG. 5 having a magnitude of $\Phi_0$ and a flux angle $\psi$, fluxes $\Phi_{dr}$ and $\Phi_{qr}$ are given by the following equations (12)

$$\left. \begin{array}{l} \Phi_{dr} = \Phi_0 \cos\psi \\ \Phi_{qr} = \Phi_0 \cos\psi \end{array} \right\} \tag{11}$$

By substituting equation (11) into equation (10), the rotor currents are expressed as follows. Thus, $$\left. \begin{array}{l} \dot\theta \Phi_0 \sin\phi + \dfrac{d\Phi_0}{dt} \cos\phi - \dot\phi \Phi_0 \sin\phi = r_r i_{dr} \\ -\dot\theta \Phi_0 \cos\phi + \dfrac{d\Phi_0}{dt} \sin\phi + \dot\phi \Phi_0 \cos\phi = r_r i_{qr} \end{array} \right\} \tag{12}$$

The output torque $T_e$ of the induction motor shown in FIG. 4 is given by the following equations.

$$T_e = K_T(\Phi_{dr} i_{qr} - \Phi_{qr} i_{dr}) \tag{13}$$

By substituting equations (11) and (12) in equation (13) we obtain:

$$T_e = K_T \frac{\Phi_0^2}{r_r} (\dot\phi - \dot\theta) \tag{14}$$

Equation (14) means that the output torque $T_e$ is precisely proportional to the slip frequency $(\dot\phi - \dot\theta)$ (rad/sec) so long as the magnitude $\Phi_0$ of the rotating field is constant.

The stator currents $i_{ds}$ and $i_{qs}$ necessary to produce this output torque $T_e$ are determined by substituting equations (11) and (12) into equation (9).

Thus, $$\left. \begin{array}{l} i_{ds} = \left( \Phi_0/l_m + \dfrac{l_r}{r_r} \dfrac{d\Phi_0/l_m}{dt} \right) \cos\phi - \dfrac{l_r}{r_r} \Phi_0/l_m(\dot\phi - \dot\theta)\sin\phi \\ i_{qs} = \left( \Phi_0/l_m + \dfrac{l_r}{r_r} \dfrac{d\Phi_0/l_m}{dt} \right) \sin\phi + \dfrac{l_r}{r_r} \Phi_0/l_m(\dot\phi - \dot\theta)\cos\phi \end{array} \right\} \tag{15}$$

To simplify equation (15), the following variables are introduced.

$$I_o = \Phi_o/l_m \qquad (16)$$
$$I_2 = \frac{l_r}{r_r} \Phi_o/l_m(\dot{\phi} - \dot{\theta})$$

By substituting equation (16) into equation (14) we obtain:

$$T_e = K_T \frac{l_m}{l_r} \Phi_o I_2 = K_T \frac{l_m^2}{l_r} I_o I_2 \qquad (17)$$

Further, by substituting equation (16) into equation (15) we obtain:

$$i_{ds} = \left(I_o + \frac{l_r}{r_r} \frac{dI_o}{dt}\right) \cos\phi - I_2 \sin\phi \qquad (18)$$
$$i_{qs} = \left(I_o + \frac{l_r}{r_r} \frac{dI_o}{dt}\right) \sin\phi + I_2 \cos\phi$$

Furthermore equation (16) shows that currents $I_2$ and $I_o$ must satisfy the following equation.

$$I_2 = \frac{l_r}{r_r} (\dot{\phi} - \dot{\theta}) I_o \qquad (19)$$

where $\dot{\phi} = d\phi/dt$ and $\dot{\theta} = d\theta/dt$ and equation (19) is equivalent to the following equation.

$$\phi - \theta = \frac{r_r}{l_r} \int \frac{I_2}{I_o} dt \qquad (20)$$

As above described, equation (17) corresponds to equation (16), equation (18) corresponds to equation (8) provided that $dI_o/dt = 0$ (when $I_o$ and $\Phi_o$ are constant), and equation (19) corresponds to equation (7). In other words, the current $I_o$ shown by equation (16) corresponds to an exciting current necessary to create flux $\Phi_o$, while current $I_2$ corresponds to a rotary current which passes current through a rotor winding orthogonal to flux $\Phi_o$. Equation (17) shows that the output torque is proportional to the product of the magnitude $\Phi_o$ of the flux and the rotor current $I_2$. Assuming a constant flux $\Phi_o$, the output torque $T_e$ would be perfectly proportional to the current $I_2$. This is the same relation as the output torque of a separately excited direct current motor.

When the rotor angular position $\theta$ (rad.) the exciting current $I_o$ and its rate of variation $dI_o/dt$ are given for a desired torque $T_e$ instructed to a two phase induction motion, we can determine currents $i_{ds}$ and $i_{qs}$ from equations (18) and (20) and when these currents are passed through the stator windings the output torque of the induction motor would become equal to the instructed value $T_e$.

In this manner, it is possible to control the output torque of the induction motor by controlling the stator currents (primary current) $i_{ds}$ and $i_{qs}$ in the same manner as in a DC motor, in order to supply currents $i_{ds}$ and $i_{qs}$ to the stator windings of an actual induction motor it is necessary to use current amplifiers. However, when the response speed and accuracy of the amplifiers are increased, the stability of the control becomes poor. Moreover, provision of the amplifiers increases the cost. For this reason, where stator winding voltages $V_{ds}$ and $V_{qs}$ are controlled instead to controlling the stator currents $i_{ds}$ and $i_{qs}$, voltage amplifiers can be used which are not only economical but also can solve the problem of stability.

The manner of controlling the stator voltages $V_{ds}$ and $V_{qs}$ according to the principle described above will now be described as follows.

In FIG. 4, the fluxes $\Phi_{ds}$ and $\Phi_{qs}$ created in the stator in the directions of axes d and q and link with the stator windings are given by the following equations.

$$\Phi_{ds} = l_s i_{ds} - l_m i_{dr} \qquad (21)$$
$$\Phi_{qs} = l_s i_{qs} - l_m i_{qr}$$

where $l_s$ represents the self inductance (H) of the stator windings.

When voltages $V_{ds}$ and $V_{qs}$ are applied across the stator windings, the following equations hold:

$$V_{ds} - \frac{d\Phi_{ds}}{dt} = r_s i_{ds} \qquad (22)$$
$$V_{qs} - \frac{d\Phi_{qs}}{dt} = r_s i_{qs}$$

where $r_s$ represents the resistance of the stator windings.

Where it is assumed that all flux linking the rotor windings also link the stator windings, since in an ordinary induction motor, the leakage flux is extremely small with respect to the total linking flux, this assumption is correct and the following equations (23) hold.

$$\Phi_{ds} = \Phi_{dr} = \Phi_o \cos\phi = l_m I_o \cos\phi \qquad (23)$$
$$\Phi_{qs} = \Phi_{qr} = \Phi_o \sin\phi = l_m I_o \sin\phi$$

Voltages $V_{ds}$ and $V_{qs}$ can be obtained as follows when equations (18) and (23) are substituted into equation (22).

$$V_{ds} = \left[r_s I_o + \left(l_m + l_r \frac{r_s}{r_r}\right) \frac{dI_o}{dt}\right] \cos\phi - [l_m I_o \dot{\phi} + r_s I_2] \sin\phi \qquad (24)$$
$$V_{qs} = \left[r_s I_o + \left(l_m + l_m \frac{r_s}{r_r}\right) \frac{dI_o}{dt}\right] \sin\phi + [l_m I_o \dot{\phi} + r_s I_2] \cos\phi$$

Consequently, where the rotor angular speed $\dot{\theta}$ (rad./sec), exciting current $I_o$ and its rate of change $dI_o/dt$ are given, the desired instructed torque $T_e$ is substituted in equation (17) to determine current $I_2$ which is substituted into equation (19) to determine $\dot{\phi}$ and $\phi$ is determined from equation (20). Then these values are substituted into equation (24) to calculate voltages $V_{ds}$ and $V_{qs}$ which when applied to the stator windings 1-1' and 2-2' shown in FIG. 4 give an output torque equal to the instructed torque $T_e$.

Although in the above voltage control equations for a two phase induction motor have been described, when the above described principle is applied to a three phase two pole induction motor, the three phase stator voltages $V_a$, $V_b$ and $V_c$ are determined as follows:

$$V_a = \left[ r_s I_o + \left( l_m + l_r \frac{r_s}{r_r} \right) \frac{dI_o}{dt} \right] \cos\phi - (l_m I_o \dot{\phi} + r_s I_2)\sin\phi \qquad (25)$$

$$V_b = \left[ r_s I_o + \left( l_m + l_r \frac{r_s}{r_r} \right) \frac{dI_o}{dt} \right] \cos\left( \phi - \frac{2\pi}{3} \right) - (l_m I_o \dot{\phi} + r_s I_2)\sin\left( \phi - \frac{2\pi}{3} \right)$$

$$V_c = \left[ r_s I_o + \left( l_m + l_r \frac{r_s}{r_r} \right) \frac{dI_o}{dt} \right] \cos\left( \phi - \frac{4\pi}{3} \right) - (l_m I_o \dot{\phi} + r_s I_2)\sin\left( \phi - \frac{4\pi}{3} \right)$$

The values of $\dot{\phi}$ and $\phi$ in equation (25) are given by equations (19) and (20).

Where the mechanical angle of a P pole motor is given by $\theta$, by substituting electrical angle $\theta' = (P/2) \cdot \theta$ of the motor into equations (19) and (20) the invention becomes applicable to any multipole induction motors.

As above described, this invention relates to a torque control system based on the principle described above. In the following, some of typical embodiments are illustrated.

EXAMPLE 1

(constant flux)

Where the magnitude of flux $\Phi_o$ is controlled always to be constant, current $I_o$ also becomes constant and $d\Phi_o/dt = 0$ and $dI_o/dt = 0$ so that the voltage control equations (25) for a three phase induction motor are simplified as follows:

$$V_a = r_s I_o \cos\phi - (l_m I_o \dot{\phi} + r_s I_s)\sin\phi \qquad (26)$$

$$V_b = r_s I_o \cos\left( \phi - \frac{2\pi}{3} \right) - (l_m I_o \dot{\phi} + r_s I_2)\sin\left( \phi - \frac{2\pi}{3} \right)$$

$$V_c = r_s I_o \cos\left( \phi - \frac{4\pi}{3} \right) - (l_m I_o \dot{\phi} + r_s I_2)\sin\left( \phi - \frac{4\pi}{3} \right)$$

Since current $I_o$ is constant, equation (20) becomes:

$$\phi = \theta + \frac{r_r}{l_r I_o} \int I_2 dt \qquad (27)$$

Noting that when flux $\Phi_o$ is constant, the output torque $T_e$ is precisely proportional to current $I_2$ as shown by equation (17), one example of the torque control system for constant flux will be described hereunder.

Figure 6:
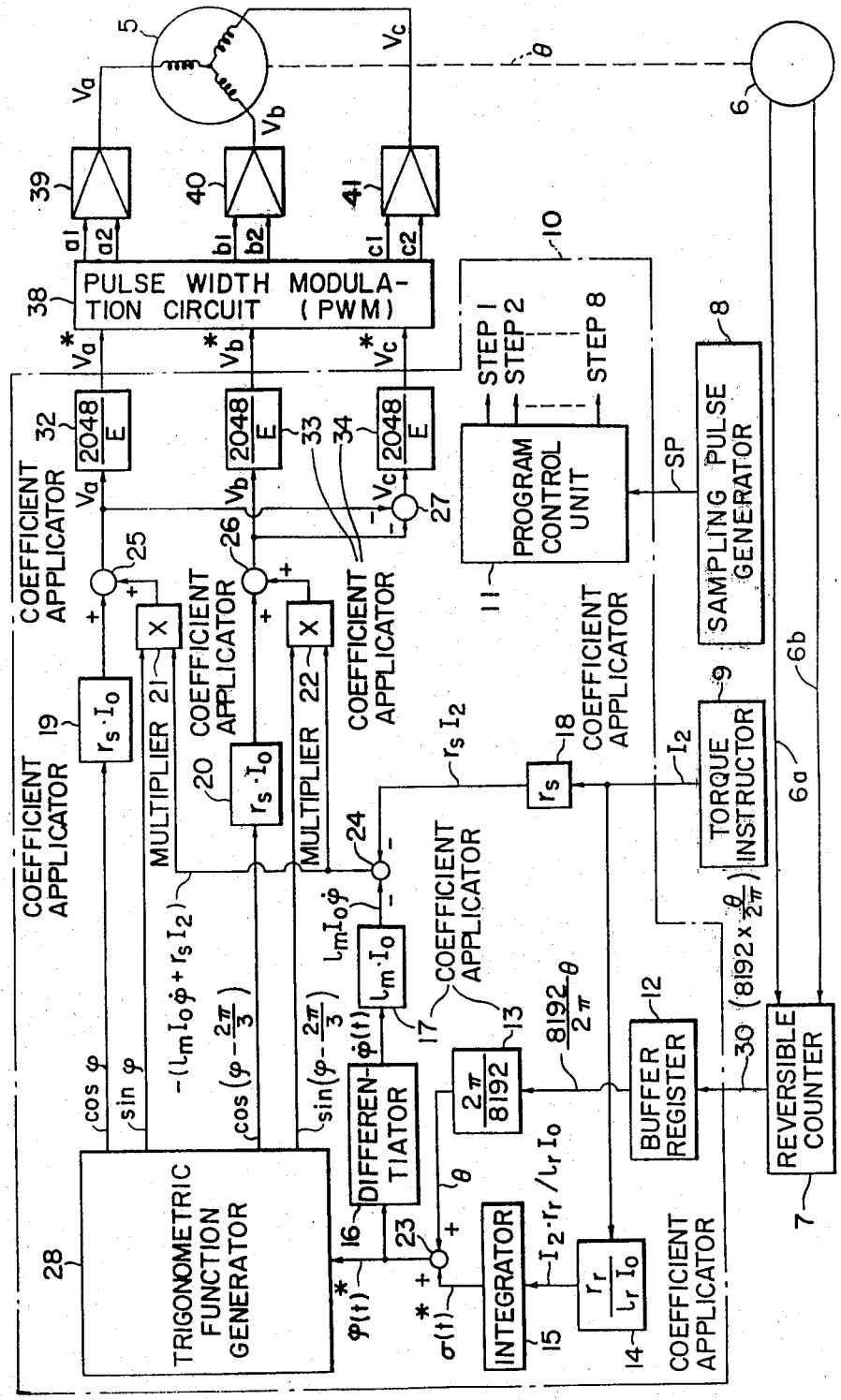
FIG. 6 is a block diagram showing a first embodiment of this invention.

FIG. 6 is a block diagram showing this example 1. More particularly, a pulse generator 6 is directly coupled to the shaft of a two pole three phase induction motor 5, so that the pulse generator 6 generates a pulse signal $6_a$ as the motor 5 rotates. Assume now that the pulse generator 6 generates 8192 pulses as the motor makes one revolution. Also the generator 6 generates a direction discrimination signal $6_b$ depending upon the forward or reverse rotation of the motor 5. These signals $6_a$ and $6_b$ are applied to a reversible counter 7. In this example, this counter 7 comprises two step 13 digit reversible counter, and each time a pulse $6_a$ is applied from the pulse generator 6 its count is increased by one in the case of the forward rotation, whereas its count is decreased by one in the case of the reverse direction. Denoting the angle of rotation of the motor 5 in one revolution by $\theta$ (rad.), the count 30 of the reversible counter 7 which may have any value in a range of 0 to 8191, that is two step 13 bits, is given by $8192 \times \theta/2\pi$, this $\theta$ corresponding to $\theta$ in equation 27.

A sampling pulse generator 8 is provided for generating a sampling pulse SP with a sampling period $T = 1/1000$ sec. which is used as an interruption input to an electronic computor 10 to be described later. Various elements bounded by do and dash lines constitute a digital computor 10.

It should be understood that coefficient applicators 13, 14, 17, 18, 19, 20, 32, 33 and 34; adders 23, 24, 25, 26 and 27; multipliers 21 and 22; a buffer register 12, an integrator 15; a differentiator 16; and a trigonometric function generator 28 in the digital computor 10 are not located at any specific positions, and that these elements are constructed as common hardware elements utilized on the time division bases under the control of a program control unit 11 in the computer 10 during the operating cycle thereof. However, for the purpose of describing in detail the program processed by the computor utilized in this invention, these elements are shown as if they are constituted by independent hardwares. With this drawing an experienced computor programmer can readily prepare any program for carrying out the invention.

In another embodiment, various hardware elements in the block 10 are constituted by digital circuits permanently wired. However, in the following description it is assumed that the block 10 comprises a digital computor.

As the sampling pulse generator 8 generates a sampling pulse SP with a period of $T = 1/1000$ sec., this sampling pulse SP is applied to an interruption input terminal of a program control unit 11 of the computor 10 to trigger the control unit so that it sequentially executes steps 1 to step 8 of the programs to be described hereinafter. The programs are executed at each $T = 1/1000$ sec., and the time required for executing the programs of steps 1 to 8 is determined to be less than $T = 1/1000$ sec. The program control unit 11 interrupts the operation of the computer 10 or executes another program not related to this invention until the next sampling pulse SP is produced.

When the program control unit 11 executes the program of step 1 upon generation of a sampling pulse SP, the content or count 30 of the reversible counter 7 is written into the computor 10 and the written count is temporarily stored in a buffer register 12. A specific memory address of the computor 10 may be used as the buffer register 12.

When the program control unit 11 executes the program of the step 2, a digital data $I_2$ corresponding to the rotor current expressed by equation 17 and supplied from a torque instructor 9 is written into the computor 10 and this data is multiplied with a constant coefficient $r_r/l_r I_o$ by the coefficient applicator 14 to obtain a data $I_2 r_r/l_r I_o$ which is integrated by an integrator 15 to form a data $\sigma^*(t)$. According to one method of calculating the output data $\sigma^*(t)$ of the integrator 15, the output data at a given sampling point is expressed by the following equation wherein $\sigma^*(t-T)$ represents the output data of the integrator 15 at the previous sampling point.

$$\sigma^*(t)=\sigma^*(t-T)+TI_2r_r/l_rI_o$$

where T represents the sampling time 1/1000 sec.

In this manner, as $TI_2r_r/l_rI_o$ is cumulatively added to data $\sigma^*(t)$ at an interval of T seconds, the $\sigma^*(t)$ corresponds to an integral of the second right hand term of equation (27). Thus $$\sigma^*(t) = \frac{r_r}{l_rI_o} \int I_2 dt$$

Then, when the program control unit 11 executes the program of step 3 the data $8192/2\pi \cdot \theta$ which has been temporarily stored in the step 1 is read out of the buffer register 12 and then multiplied with a coefficient $2\pi/8192$ by the coefficient applicator 13 to form data $\theta$ corresponding to the righthand first term of equation (27). The data $\theta$ is added to data $\sigma^*(t)$ obtained in the second step 2 in the adder 23 to obtain a sum $\phi^*(t)$ which corresponds to the flux angle $\phi$ in equation (27).

Then, the program of step 4 is executed and the trigonometric function generator 28 calculates trigonometric functions $\cos \phi$, $\sin \phi$, $$\cos\left(\phi - \frac{2\pi}{3}\right) \text{ and } \sin\left(\phi - \frac{2\pi}{3}\right)$$

based on the flux angle $\phi$ obtained in step 3.

Then, the program of step 5 is executed in which the flux angle $\phi(t)$ obtained in step 3 is differentiated by the differentiator 16 to form data $\dot\phi^*(t)$. This data can be calculated by the following equation:

$$\dot\phi^*(t) = \frac{1}{T}[\phi^*(t) - \phi^*(t-T)]$$

wherein $\dot\phi^*t$ represents the flux angle $\phi^*(t)$ at a given sampling time, $\phi^*(t-T)$ the flux angle at a preceding sampling point and T a sampling time equal to 1/1000 sec. The differentiated data $\dot\phi^*$ is multiplied with a coefficient $l_mI_o$ by the coefficient applicator 17 to form data $l_mI_o\dot\phi$.

Then, the program of step 6 is executed in which the output $I_2$ from the torque instructor 9 is multiplied with a constant coefficient $r_s$ by the coefficient applicator 18 to form data $r_sI_2$ which is subtracted by adder 24 from data $l_mI_o\dot\phi$ calculated in step 5 to form data $-(l_mI_o\dot\phi+r_sI_2)$ which corresponds to the amplitude of the sine functions in the righthand terms of equations (26).

Then, the program of step 7 is executed to obtain $V_a$ and $V_b$ in equations 27 from $\cos \phi$, $\sin \phi$, $$\cos\left(\phi - \frac{2\pi}{3}\right),$$

$$\sin\left(\phi - \frac{2\pi}{3}\right)$$

obtained in step 4, and $-(l_mI_o\dot\phi+r_sI_2)$ obtained in step 6 according to the following calculations by using multipliers 21 and 22 and adders 25 and 26.

$$\left.\begin{array}{l}V_a=r_sI_o\cos\phi-(l_mI_o\dot\phi+r_sI_2)\sin\phi \\ V_b=r_sI_o\cos\left(\phi-\frac{2\pi}{3}\right)-(l_mI_o\dot\phi+r_sI_2)\sin\left(\phi-\frac{2\pi}{3}\right)\end{array}\right\} \quad (26)'$$

$V_a$ and $V_b$ are subtracted in adder 27 to obtain $V_c = -(V_a+V_b)$ because the following equation (28) always holds from equations (26).

$$V_a+V_b+V_c=0 \qquad (28)$$

The program of step 8 is then executed and data $V_a$, $V_b$ and $V_c$ obtained in step 7 are multiplied with a constant coefficient 2048/E respectively by coefficient applicators 32, 33 and 34 to form data $V_a^*$, $V_b^*$ and $V_c^*$ which are respectively written by the computor 10 into three pairs of binary 12 bit holding registers, not shown, in a pulse width modulation circuit 38 (PWM). Assume now that E of the coefficient 2048/E is equal to the maximum value of the voltages $V_a$, $V_b$ and $V_c$, the values of the voltages $V_a^*$, $V_b^*$ and $V_c^*$ would lie in a range of from $-2048$ to $+2047$ in this example so that the 12 bit holding registors would not overflow.

Figure 7:
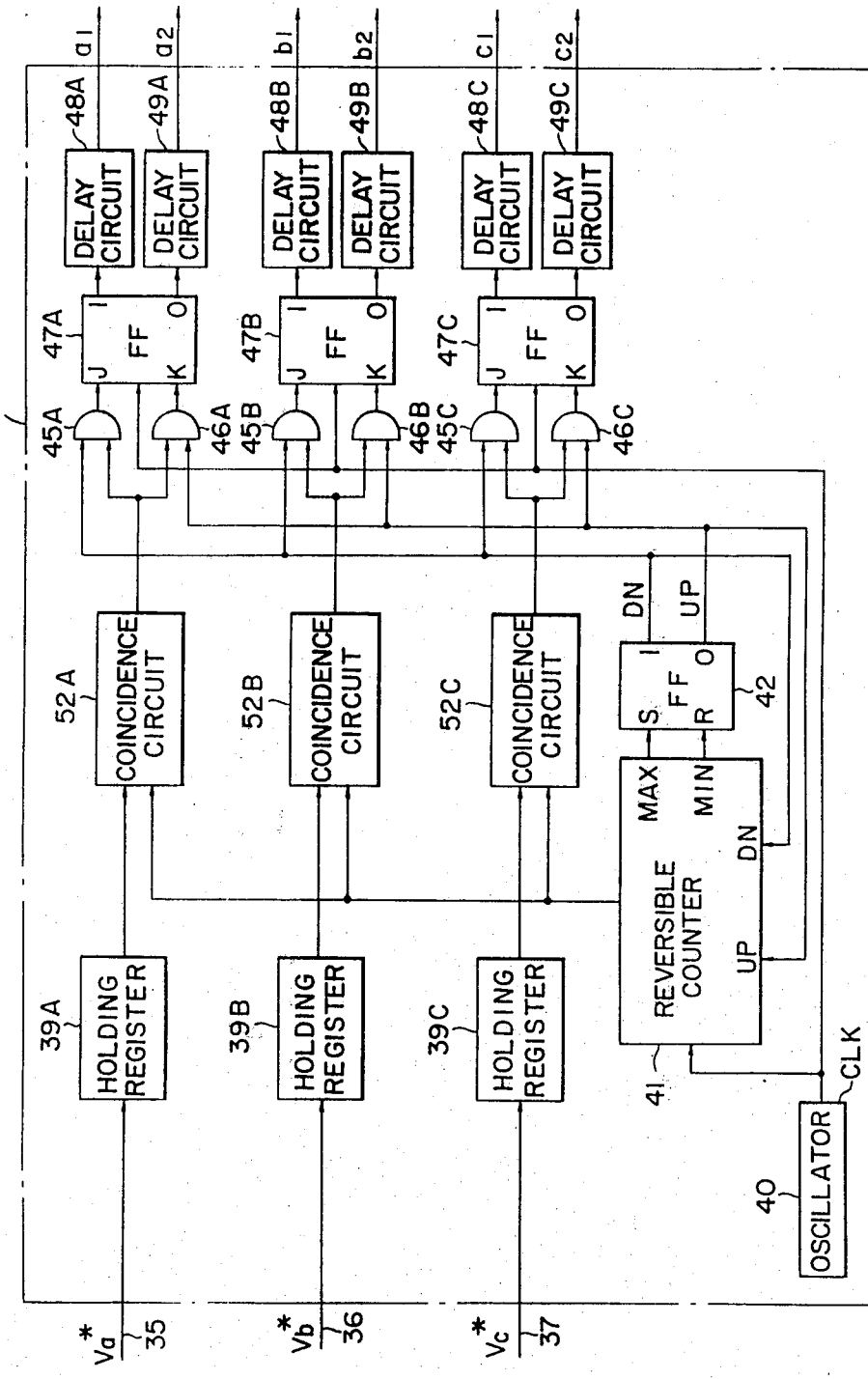
FIG. 7 is a connection diagram showing the detail of the pulse width modulation (PWM) circuit 38 shown in FIG. 6.

The process of calculating the instructed stator voltages $V_a^*$, $V_b^*$ and $V_c^*$ with the computor 10 has been described. The operation of the PWM circuit 38 will now be described as follows. The detail of the PWM circuit 38 is shown in FIG. 7. Thus, binary 12 bit data $V_a^*$, $V_b^*$ and $V_c^*$ produced by the computor 10 are stored in holding registers 39A, 39B and 39C respectively, each of which being a 12 bit register capable of storing data in a range of from $-2048$ to $+2047$. The content of the holding register 39A is inputted to a coincidence circuit 52A over a 12 bit data line.

Figure 8:
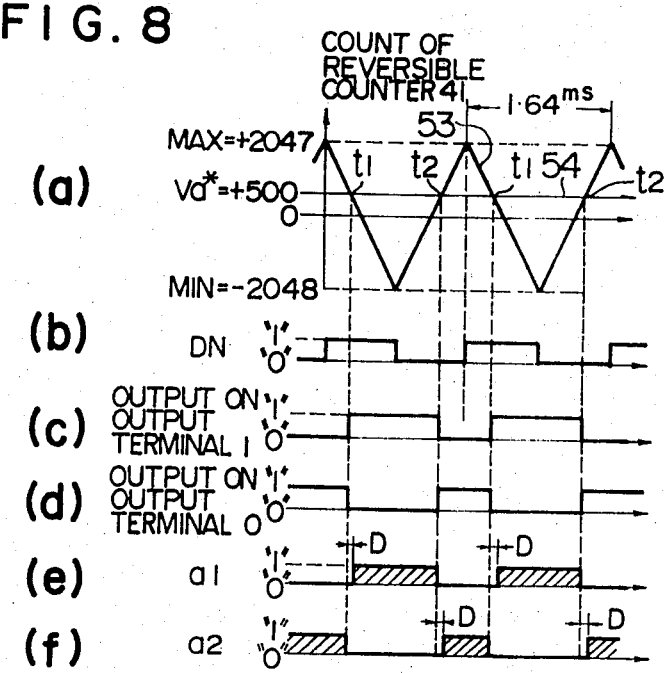
FIGS. 8a through 8f are time charts showing one example of operation of the circuit shown in FIG. 7.

There are also provided an oscillator 40 generating a clock pulse of a constant frequency, for example 5 MHz, and a 2 step 12 bit reversible counter 41 capable of operating between $-2048$ and $+2047$. While its UP input is "1"(high level logic) the count of the counter 41 increases each time it receives a clock pulse CLK and when its count reaches a maximum value of $+2047$, the counter produces a MAX output of "1". This MAX output is applied to a set terminal S of a flip-flop circuit 42 to make "1" the output signal DN at the output terminal 1 and "0" the output signal UP at the output terminal 0. The signal DN changes the reversible counter to a down count mode, whereby the count of the reversible counter 41 decreases each time it receives a clock pulse CLK. Finally its count reaches a minimum value of $-2048$. Then, the MIN output of the counter becomes "1" and this MIN output is applied to the reset terminal R of the flip-flop circuit 42 to change its output UP to "1" and output DN to "0". In this manner, as shown in FIG. 8a, the count of the reversible counter 41 repeatedly increases and decreases with a constant inclination in a range of from $-2048$ and $+2047$ and at a period of $4096\times2/5$ MHz=1.64ms. The signal DN from the output 1 of the flip-flop circuit 42 varies as shown in FIG. 8b. The count of the reversible counter 41 is applied to the coincidence circuits 52A-52C.

The coincidence circuits produce outputs "1" only when the contents of the holding registers 39A-39C coincide with the count of the reversible counter 41.

When AND gate circuits 45A through 45C provided on the side of inputs J of J - K flip-flop circuits 47A-47C are enabled these flip-flop circuits are set to produce outputs "1" at their output terminals 1, whereas when AND gate circuits 46A-46C on the side of the inputs K are enabled the flip-flop circuits 47A-47C are reset to produce outputs "1" at their input terminals 0. At this time, when the data $V_a^*$ are produced by the computor 10 has a magnitude of +500v as shown by a straight line 54 shown in FIG. 8a, at times $t_1$ and $t_2$, the contents of the holding register 39A and the reversible counter coincide with each other, so that the coincidence circuit 52A produces an output "1". Since signal DN is "1" at time $t_1$ the flip-flop circuit 47A is set, whereas at time $t_2$ the UP signal is "1", so that the flip-flop circuit 47A would be reset. Thus, the outputs of the output terminals 1 and 0 of the flip-flop circuit 47A vary as shown in FIGS. 8c and 8d respectively. On the other hand, the delay circuits 48A-48C produce output signals $a_1$ shown in FIG. 8e which lags by D than the leading ends of output signals "1" produced by the output terminals 1 of the flip-flop circuits 47A-47C, and the delay circuits 49A-49C produce output signals $a_2$ which lags by D than the leading ends of the output signals "1" produced by the output terminals 0 of the flip-flop circuits 47A-47C. These output signals $a_1$ and $a_2$ are used to drive transistor power amplifiers 39-41 to be described later.

As shown in FIGS. 8e and 8f, the pulse width of the output signals $a_1$ and $a_2$ are modulated by the contents of the holding registers 39A-39C. More particularly, when the value of voltage $V_a^*$ is equal to $-2048$ the output signal $a_1$ is always "0" and as the value of $V_a^*$ increases from $-2048$ the interval in which the signal $a_1$ becomes "1" is prolonged. The output signal $a_1$ is always "1" when $V_a^*$ becomes equal to $+2047$. When the output signal $a_1$ is "1", the output signal $a_2$ is always "0". Conversely, when the signal $a_2$ is "1", signal $a_1$ is "0". The purpose of establishing interval D during which both signals $a_1$ and $a_2$ become "0" is to protect the transistors of the transistor power amplifiers 39-41.

In FIG. 7, output signals $b_1$ and $b_2$ for phase B are subjected to pulse width modulation by the holding register 39B that stores the output data $V_b^*$ of the computor 10 in the same manner as the output signals $a_1$ and $a_2$ for phase A.

Having described the operation of the PWM circuit 38, we now describe the construction and operation of the transistor power amplifiers 39-41.

As shown in FIG. 6, the A phase outputs $a_1$ and $a_2$ of the PWM circuit 38 are applied to the transistor power amplifier 39 which supplies a stator voltage $V_a$ to the induction motor 5. In the same manner, the B phase outputs $b_1$ and $b_2$ are applied to the power amplifier 40 to produce stator voltage $V_b$ and the C phase voltage $c_1$ and $c_2$ are applied to the power amplifier 41 to produce stator voltage $V_c$.

Figure 9:
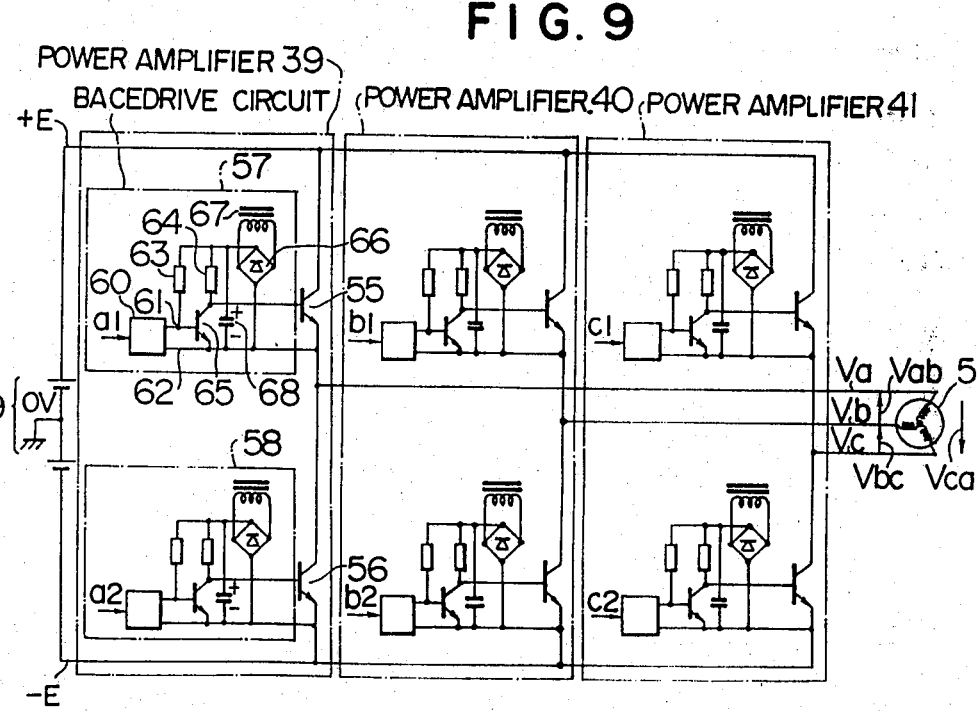
FIG. 9 is a connection diagram showing the detail of the power amplifiers 39–41 shown in FIG. 6.

The detail of the power amplifiers 39, 40 and 41 is shown in FIG. 9. Since these amplifiers have the same construction, the power amplifier 39 alone will be described in detail. Thus, this power amplifier comprises two power transistors 55 and 56 connected across DC lines +E and −E so that the stator voltage $V_a$ of the induction motor 5 is switched between +EV and −EV by alternately turning ON and OFF these transistors.

The base drive circuit 57 of the transistor 55 turns ON the same when the output signal $a_1$ of the PWM circuit 38 is "1" to make the stator voltage $V_a$ to be equal to +EV whereas when the signal $a_1$ is "0" turns OFF the transistor 55. In the same manner, the base drive circuit 58 of transistor 56 turns ON the same when the output signal $a_2$ of the PWM circuit 38 is "1" to make the stator voltage $V_a$ to be equal to −EV, whereas turn OFF the transistor 56 when the output signal $a_2$ is "0".

It should be noted that when signal $a_1$ changes to "0" to turn OFF the transistor 55, it does not turn off immediately due to the inductance of the motor. For this reason, at the time of changing the signal $a_1$ from "1" to "0", if the signal $a_2$ is immediately changed from "0" to "1", the DC source 59 would be short circuited, thus rupturing transistors 55 and 56. For this reason the delay circuits 48A-48C and 49A-49C are included in the PWM circuit 38 for the purpose of changing signal $a_2$ to "1" only after the signal $a_1$ has been changed to "0" and the transistor has been completely turned OFF.

The base drive circuit 57 comprises an insulating transformer 67 with its primary winding, not shown, energized with AC voltage, a bridge connected rectifier 66 and a capacitor 68 connected across the output terminals of the rectifier to produce a floating DC voltage. The negative terminal of capacitor 68 is connected to the emitter electrode of transistor 55, such floating DC voltage being necessary because the emitter voltage $V_a$ varies alternately between ±EV. When the output signal $a_1$ applied to a photocoupler 60 in the base drive circuit 57 becomes "1", the photocoupler produces an output signal across output terminals 61 and 62 which turns ON transistor 65. Accordingly, the floating DC voltage passes base current to the power transistor 55 via a resistor 64 to turn ON the transistor 55 whereby to change the stator voltage to +E.

Figure 10:
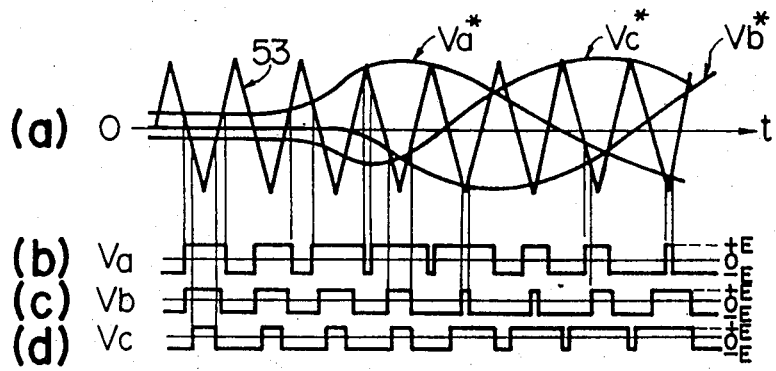
FIGS. 10a–10d and FIGS. 11a and 11b are waveforms useful to explain the operation of the power amplifiers.

On the other hand, as the signal $a_1$ becomes "0", the photocoupler 60 does not produce an output so that current flows through the base electrode of the transistor 65 via resistor 63 thus turning ON transistor 65 thereby turning OFF the power transistor 55. The base drive circuit 58 for the power transistor 56 has the same construction.

Where data $V_a^*$, $V_b^*$ and $V_c^*$ outputted by the computor 10 vary with time t as shown in FIG. 10a, the voltages $V_a$, $V_b$ and $V_c$ applied to the motor 5 from the PWM circuit 38 via transistor power amplifiers 39-41 assume two values of +E and −E as shown in FIGS. 10b, 10c and 10d and the data $V_a^*$, $V_b^*$ and $V_c^*$ become rectangular waves pulse width modulated with a triangular wave 53 shown in FIG. 10a. The mean values $\bar{V}_a$, $\bar{V}_b$ and $\bar{V}_c$ of the rectangular voltages $\bar{V}_a$, $\bar{V}_b$ and $\bar{V}_c$ from which triangular carrier frequency harmonic components have been eliminated are $$\tilde{V}_a = \frac{E}{2048} * V_b^*, \tilde{V}_c = \frac{E}{2048} * V_b^* \text{ and } \tilde{V}_c = \frac{E}{2048} * V_c^*$$

meaning that the mean values $\bar{V}_a$, $\bar{V}_b$ and $\bar{V}_c$ are exactly proportional to the instructed volfages $V_a^*$, $V_b^*$ and $V_c^*$. Thus, when pulse width modulated rectangular waves as shown in FIGS. 10b, 10c and 10d are applied to the stator windings of the motor 5, the stator currents become smooth currents in which the harmonic components of the rectangular waveform voltages have been eliminated by the reactance of the motor 5. As a consequence, the flux created in the motor is proportional to these smooth currents. Thus, when the mean values of the pulse width modulated waveform voltages shown in FIGS. 10b, 10c and 10d and applied to the motor are proportional to the instructed value, it is equivalent to a case where voltages expressed by equations (26) are applied. In other words, the induction motor is operated by a voltage control by equations (26) and (27).

From the foregoing description, it will be clear that with the construction shown in FIG. 6, the induction motor 5 can produce a torque exactly proportional to the torque $I_2$ given by the torque instructor 9.

EXAMPLE 2

(maximum voltage increasing control)

In Example 1, voltages $V_a$, $V_b$ and $V_c$ were controlled according to equations 26. These equations can be modified as follows.

$$\left. \begin{array}{l} V_a = \sqrt{(r_sI_o)^2 + (l_mI_o\dot{\phi} + r_sI_2)^2} \cos(\phi + \delta) \\ V_b = \sqrt{(r_sI_o)^2 + (l_mI_o\dot{\phi} + r_sI_2)^2} \cos\left(\phi + \delta - \frac{2\pi}{3}\right) \\ V_c = \sqrt{(r_sI_o)^2 + (l_mI_o\dot{\phi} + r_sI_2)^2} \cos\left(\phi + \delta - \frac{4\pi}{3}\right) \end{array} \right\} \quad (29)$$

provided that $$\tan\delta = \frac{l_mI_o\dot{\phi} + r_sI_2}{r_sI_o}$$

From FIG. 9 it can be noted that the maximum values of voltages $V_a$, $V_b$ and $V_c$ can not exceed the DC source voltage $\pm EV$. Thus the amplitude term $$\sqrt{(r_sI_o)^2 + (l_mI_o\dot{\phi} + r_sI_2)^2}$$

in equations 29 does not exceed the voltage E. Where it is necessary to increase the amplitude term it is necessary to increase the DC voltage $\pm EV$. This requires, however, to use power transistors 55 and 56 having a high breakdown voltage. The line voltages $V_{ab}=V_a-V_b$, $V_{bc}=V_b-V_c$ and $V_{ca}=V_c-V_a$ are expressed by the following equations:

$$\left. \begin{array}{l} V_{ab} = \sqrt{3} \sqrt{(r_sI_o)^2 + (l_mI_o\dot{\phi} + r_sI_2)^2} \cos\left(\phi + \delta + \frac{\pi}{6}\right) \\ V_{bc} = \sqrt{3} \sqrt{(r_sI_o)^2 + (l_mI_o\dot{\phi} + r_sI_2)^2} \cos\left(\phi + \delta + \frac{\pi}{6} - \frac{2\pi}{3}\right) \\ V_{ca} = \sqrt{3} \sqrt{(r_sI_o)^2 + (l_mI_o\dot{\phi} + r_sI_2)^2} \cos\left(\phi + \delta + \frac{\pi}{6} - \frac{4\pi}{3}\right) \end{array} \right\} \quad (30)$$

As above described the amplitude term $$\sqrt{(r_sI_o)^2 + (l_mI_o\dot{\phi} + r_sI_2)^2}$$

does not exceed E, so that line voltages do not exceed $\sqrt{3}E$. In other words, in Example 1, the maximum value of the line voltages applied to the motor is limited to $\sqrt{3}E$.

Since the power amplifiers 39–41 shown in FIG. 9 have a capability of producing a maximum line voltage of 2E, in Example 1, the maximum line voltage is lesser by $\sqrt{3}/2$. In contrast, Example 2 can produce maximum line voltages up to 2E.

The voltage control equations in Example 2 are shown as follows.

$$\left. \begin{array}{l} V_a = \sqrt{(r_sI_o)^2 + (l_mI_o\dot{\phi} + r_sI_2)^2} \cos(\phi + \delta) + V_N \\ V_b = \sqrt{(r_sI_o)^2 + (l_mI_o\dot{\phi} + r_sI_2)^2} \cos\left(\phi + \delta - \frac{2\pi}{3}\right) + V_N \\ V_c = \sqrt{(r_sI_o)^2 + (l_mI_o\dot{\phi} + r_sI_2)^2} \cos\left(\phi + \delta - \frac{4\pi}{3}\right) + V_N \end{array} \right\} \quad (31)$$

These equations (31) are similar to equations (26) except that the same variable $V_N$ is added to each right hand term. In the equations (31) the line voltages $V_{ab}$, $V_{bc}$ and $V_{ca}$ applied to the motor are equal to those expressed by equations (31). This means that the control is effected according to the above described principle of the induction motor. In Example 2, the amplitude term $$\sqrt{(r_sI)^2 + (l_mI_o\dot{\phi} + r_sI_2)^2}$$

can have a maximum value of $$\frac{2}{\sqrt{3}}E.$$

The variable $V_N$ in the voltage control equations (31) is selected as follows. Thus, when each of the first terms on the righthand sides of equations (31)

$$\sqrt{(r_sI_o)^2 + (l_mI_o\dot{\phi} + r_sI_2)^2} \cdot \cos(\phi + \delta),$$

$$\sqrt{(r_sI_o)^2 + (l_mI_o\dot{\phi} + r_sI_2)^2} \cos\left(\phi + \delta - \frac{2\pi}{3}\right)$$

and $$\sqrt{(r_sI_o)^2 + (l_mI_o\dot{\phi} + r_sI_2)^2} \cos\left(\phi + \delta - \frac{4\pi}{3}\right)$$

lies in a range of $-E$ and $+E$, $V_N$ is selected to be zero. The value of $V_N$ is determined such that when either one of the above mentioned first terms decreases below $-E$, the righthand term of each phase will become $-E$, whereas when either one of the first terms increases beyond $+E$, the righthand term of each phase will become $+E$.

Figure 11:
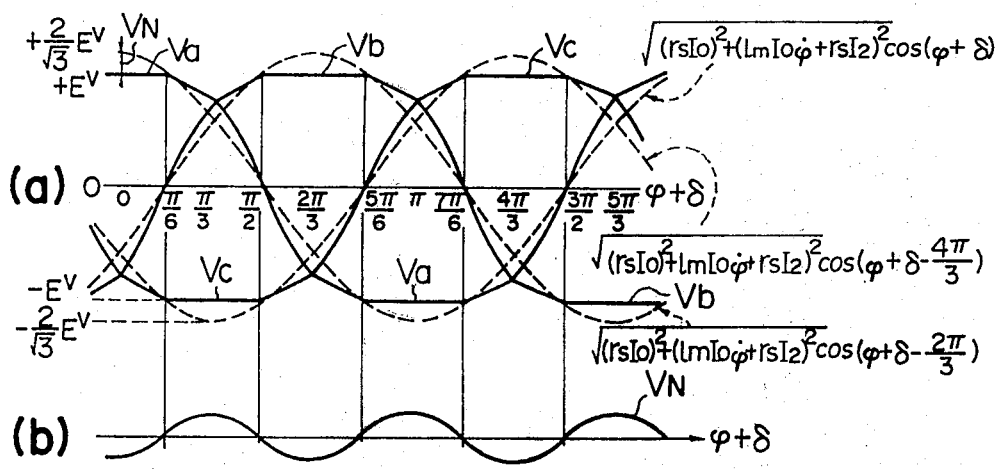

FIGS. 11a and 11b are a graph showing the manner of changing $V_N$ when the amplitude value $$\sqrt{(r_s I_o)^2 + (l_m I_o \phi + r_s I_2)^2}$$

shown in equations (31) is equal to $$\frac{2}{\sqrt{3}} E$$

in which the dotted lines of FIG. 13a show the first terms of the righthand sides of equations (31). More particularly, since the first term $$\sqrt{(r_s I_o)^2 + (l_m I_o \phi + r_s I_2)^2}$$

on the righthand side for voltage $V_a$ expressed by equations (31) is larger than $+E$, $V_N$ is determined such that $V_a$ would be equal to $+E$, whereas where $\phi + \delta = \pi/6 - \pi/2$ since the first term on the righthand side $$\sqrt{(r_s I_o)^2 + (l_m I_o \phi + r_s I_2)^2} \cos\left(\phi + \delta - \frac{4\pi}{3}\right)$$

for phase voltage $V_c$ is less than $-E$ the value of $V_N$ is determined such that $V_c$ would be equal to $-E V$. In the same manner $V_N$ is determined as shown in FIG. 11b. Thus phase voltages $V_a$, $V_b$ and $V_c$ expressed by equations (31) vary with $\phi + \delta$ as shown by solid lines in FIG. 11a. FIG. 11a shows that the permissible maximum value of the phase voltages $V_{ab}$, $V_{bc}$ and $V_{ca}$ is 2E. The detail of the second embodiment will be described in detail with reference to FIG. 12.

Figure 12:
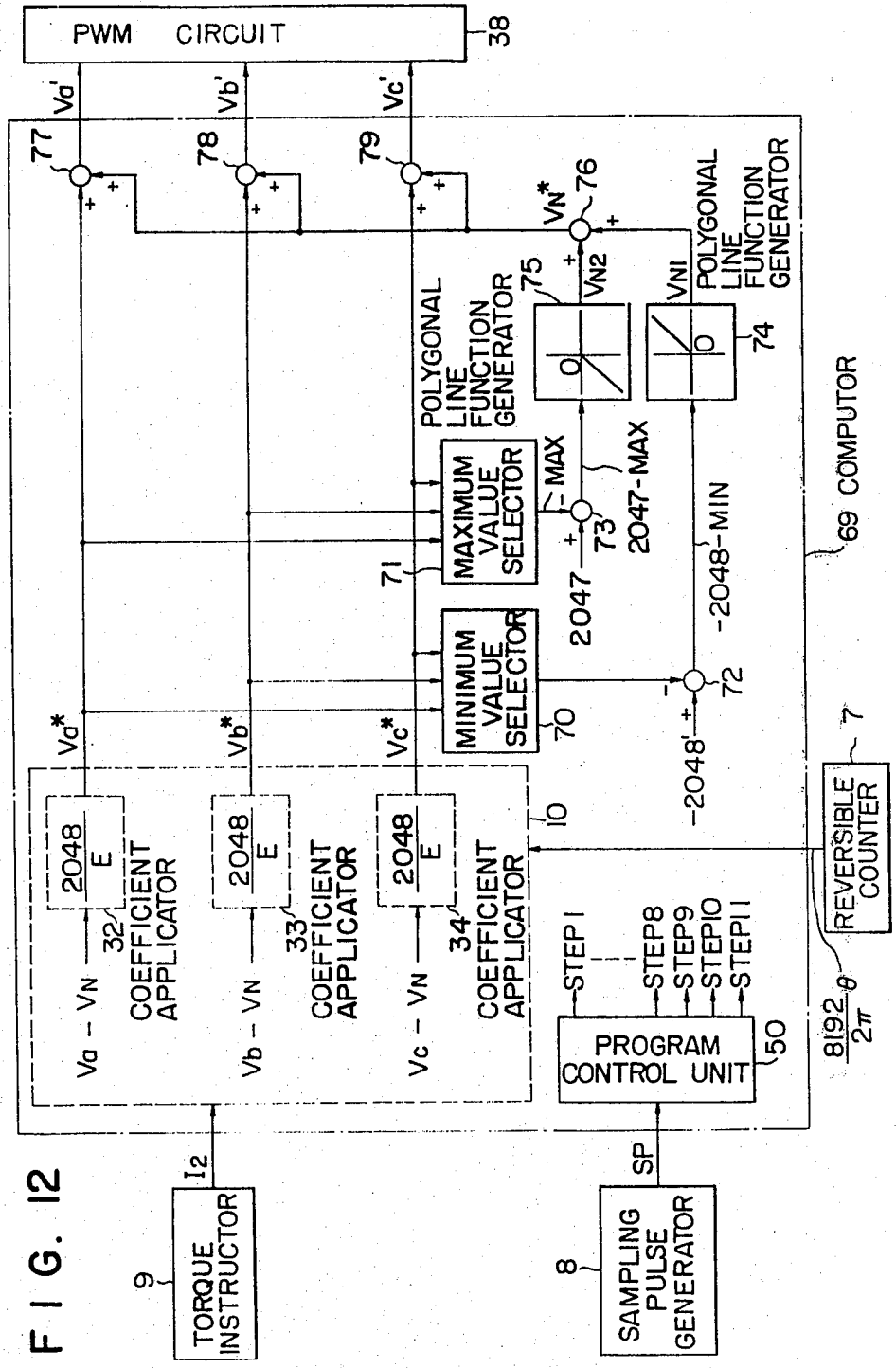
FIG. 12 is a block diagram showing a second embodiment of this invention.

The construction of the second embodiment is identical to that of embodiment 1 except the block 10 shown in FIG. 6. In the second embodiment, the computor is constructed as shown in a block 69. The processing effected by block 69 is the same as that effected by block 10 of the embodiment 1. The program control unit 50 in the block or computor 69 processes the steps 1 to 7 just in the same manner as in the first embodiment to calculate $V_a - V_N$, $V_b - V_N$ and $V_c - V_N$ in equations (31). After executing the steps 1 to 7, the program control unit 50 executes the program of the step 8 in which $V_a - V_N$, $V_b - V_N$ and $V_c - V_N$ obtained in the step 7 are respectively multiplied with a constant coefficient $2048/E$ to obtain data $V_a^*$, $V_b^*$ and $V_c^*$. While in the first embodiment a permissible range of the values of $V_a$, $V_b$ and $V_c$ obtainable from equations (26) is from $-E$ to $+E$, in the second embodiment, since the permissible range of $V_a - V_N$, $V_b - V_N$ and $V_c - V_N$ in equations (31) is from $$-\frac{2}{\sqrt{3}} E \text{ to } +\frac{2}{\sqrt{3}} E.$$

the data $V_a^*$, $V_b^*$ and $V_c^*$ shown in FIG. 12 would have values in a range of from $$-\frac{2}{\sqrt{3}} \times 2048 \text{ to } +\frac{2}{\sqrt{3}} \times 2047.$$

Then the program control unit 50 executes the program of step 9. A minimum value selector 70 selects the minimum one of data $V_a^*$, $V_b^*$ and $V_c^*$ as a signal MIN which is subtracted from a constant value $-2048$ in a subtractor 72 to input data $(-2048 - \text{MIN})$ to a polygonal line function generator 74, which when its input is negative produces an output $V_{N1} = \text{"0"}$ whereas when its input is positive produces an output equal to the input. Accordingly, when the minimum value MIN is smaller than $-2048$, $V_{N1} = -2048 - \text{MIN}$, whereas when the minimum value MIN is larger than $-2048$, $V_{N1} = 0$.

Then, the program of step 10 is executed and the maximum selector 71 produces the largest one of the data $V_a^*$, $V_b^*$ and $V_c^*$ as an output MAX which is subtracted from a constant value $+2047$ in a subtractor 73 to produce data $(+2047 - \text{MAX})$ which is inputted to the polygonal line function generator 75, which when its input is positive produces an output $V_{N2} = \text{"0"}$, whereas when its input is negative produces an output $V_{N2}$ equal to the input. Consequently, when the maximum value MAX is larger than $+2047$, $V_{N2} = 2047 - \text{MAX}$, whereas when the maximum value MAX is smaller than $+2047$, $V_{N2} = 0$. So long as the data $V_a - V_N$, $V_b - V_N$ and $V_c - V_N$ calculated by equation (31) lie in a range of from $$-\frac{2}{\sqrt{3}} E \text{ and } +\frac{2}{\sqrt{3}} E$$

the minimum value MIN is lesser than $-2048$ and the maximum value MAX does not exceed $+2047$. As a consequence, either one of the data $V_{N1}$ and $V_{N2}$ is always zero.

Then the program of step 11 is executed and data $V_{N1}$ and $V_{N2}$ are added together in an adder 76 to form data $V_N^*$ which is added to data $V_a^*$, $V_b^*$ and $V_c^*$ respectively obtained by the program of step 8 by adders 77, 78 and 79 respectively to obtain data $V_a'$, $V_b'$ and $V_c'$. These data are respectively written into three pairs of 12 bit holding registers in the PWM circuit 38 by the computor 69. When either one of the data $V_a^*$, $B_b^*$ and $V_c^*$ is smaller than $-2048$ or larger than $+2047$, since the data $V_N^*$ is determined such that the sum of such data and $V_N^*$ would become equal to $-2048$ or $+2047$, the data $V_a'$, $V_b'$ and $V_c'$ always lies in a range of from $-2048$ to $+2047$ so that the three pairs of the holding registers A, B and C may be of the 12 bit type. Accordingly, in this embodiment 2 too, the PWM circuit 38 and power amplifiers 39-41 having the same construction as in embodiment 1 can be used.

EMBODIMENT 3

(flux change torque control)

In the above described maximum voltage increase control of embodiment 2, the permissible maximum value of the voltage amplitude $$\sqrt{(r_s I_o)^2 + (l_m I_o \phi + r_s I_2)^2} \text{ was } \frac{2}{\sqrt{3}}$$

and voltage E was limited by the breakdown voltage of the power transistors of the power amplifiers shown in FIG. 9. In an application requiring a high motor speed $\theta$, the flux angular speed $\phi$ is also high and the voltage amplitude value $$\sqrt{(r_s I_o)^2 + (l_m I_o \dot\phi + r_s I_2)^2}$$

should be larger than $$\frac{2}{\sqrt{3}} E.$$

When $\dot\phi$ is large, in the embodiment 2, the flux current $I_o$ is decreased in order to make the amplitude value to be less than $$\frac{2}{\sqrt{3}}.$$

In such a case, however, as can be noted from equation (17) the output torque $T_e$ tends to decrease for the same rotor current $I_2$. Consequently, in the Embodiment 3, to obviate this difficulty, when the motor speed $\dot\theta$ is less than a predetermined speed $\dot\theta_B$ (base speed) the exciting current $I_o$ is maintained at a constant or rated value $I_{OB}$, whereas when the motor speed is higher than $\dot\theta_B$ the exciting current $I_o$ is decreased so as to maintain the amplitude value $$\sqrt{(r_s I_o)^2 + (l_m I_o \dot\phi + r_s I_2)^2}$$

to be always smaller than $$\frac{2}{\sqrt{3}} E,$$

thus fully utilizing the rating of the induction motor.

In this embodiment, since the exciting current $I_o$ varies the following voltage equations are used in which a variable $U_N$ is added to equations (25)

$$V_a = \left[ r_s I_o + \left( l_m + l_r \frac{r_s}{r_r} \right) \frac{dI_o}{dt} \right] \cos\phi - (l_m I_o \dot\phi + r_s I_2) \sin\phi + V_N$$

$$V_b = \left[ r_s I_o + \left( l_m + l_r \frac{r_s}{r_r} \right) \frac{dI_o}{dt} \right] \cos\left(\phi - \frac{2\pi}{3}\right) - (l_m I_o \dot\phi + r_s I_2) \sin\left(\phi - \frac{2\pi}{3}\right) + V_N \quad (32)$$

$$V_c = \left[ r_s I_o + \left( l_m + l_r \frac{r_s}{r_r} \right) \frac{dI_o}{dt} \right] \cos\left(\phi - \frac{4\pi}{3}\right) - (l_m I_o \dot\phi + r_s I_2) \sin\left(\phi - \frac{4\pi}{3}\right) + V_N$$

and $$\phi - \theta = \frac{r_r}{l_r} \int \frac{I_2}{I_o} dt$$

$$\dot\phi - \dot\theta = \frac{r_r}{l_r} \cdot \frac{I_2}{I_o} \quad (33)$$

Equations (32) can be modified as follows.

$$V_a = \sqrt{\left[ r_s I_o + \left( l_m + l_r \frac{r_s}{r_r} \right) \frac{dI_o}{dt} \right]^2 + [l_m I_o \dot\phi + r_s I_2]^2} \cos(\phi + \gamma) + V_N$$

$$V_b = \sqrt{\left[ r_s I_o + \left( l_m + l_r \frac{r_s}{r_r} \right) \frac{dI_o}{dt} \right]^2 + [l_m I_o \dot\phi + r_s I_2]^2} \cos\left(\phi + \gamma - \frac{2\pi}{3}\right) + V_N \quad (34)$$

$$V_c = \sqrt{\left[ r_s I_o + \left( l_m + l_r \frac{r_s}{r_r} \right) \frac{dI_o}{dt} \right]^2 + [l_m I_o \dot\phi + r_s I_2]^2} \cos\left(\phi + \gamma - \frac{4\pi}{3}\right) + V_N$$

where $$\tan\gamma = \frac{l_m I_o \dot\phi + r_s I_2}{r_s I_o + \left( l_m + l_r \frac{r_s}{r_r} \right) \frac{dI_o}{dt}}$$

As above described, it is impossible to make the amplitude value $$\sqrt{\left[ r_s I_o + \left( l_m + l_r \frac{r_s}{r_r} \right) \frac{dI_o}{dt} \right]^2 + [l_m I_o \dot\phi + r_s I_2]^2}$$

in equation (34) to be larger than $$\frac{2}{\sqrt{3}} E.$$

In other words, the following relation should hold.

$$\left[ r_s I_o + \left( l_m + l_r \frac{r_s}{r_r} \right) \frac{dI_o}{dt} \right]^2 + [l_m I_o \dot\phi + r_s I_2]^2 \leq \frac{4}{3} E^2$$

Assuming a sampling period of T=1/1000 sec., and that the value of the current $I_o$ at one sampling period before is equal to $I_o^*$, the following relation must be satisfied.

$$\left[ r_s I_o + \left( l_m + l_r \frac{r_s}{r_r} \right) \frac{1}{T} (I_o - I^*_o) \right]^2 + \quad (A)$$

$$[l_m I_o \dot\phi + r_s I_2]^2 \leq \frac{4}{3} E^2$$

Substituting $$\dot\phi = \dot\theta + \frac{r_r}{l_r} \frac{I_2}{I_o}$$

in equation (33) into equation A, $$\left[ r_s I_o + \left( l_m + l_r \frac{r_s}{r_r} \right) \frac{1}{T} (I_o - I_o^*) \right]^2 + \quad (35)$$

$$\left[ l_m I_o \dot\theta + \left( \frac{l_m}{l_r} r_r + r_s \right) I_2 \right]^2 \leq \frac{4}{3} E^2$$

In the embodiment 2, for the purpose of satisfying equations (35) the exciting current $I_o$ is controlled such that the following equation holds when the absolute value of the motor speed $\dot\theta$ is higher than the base speed $\dot\theta_B$.

$$(r_s I_o)^2 + \left[ l_m I_o |\dot\theta| + \left( \frac{l_m}{l_r} r_r + r_s \right) I_{2m} \right]^2 = \frac{4}{3} E^2 - \alpha^2 \quad (36)$$

In this equation, $I_o$ is always positive and $I_{2m}$ represents the maximum value ($|I_2| \leq I_{2m}$) of the rotor current $I_2$. $\alpha^2$ has a constant value and is selected to be a minimum value among values which satisfies the following relation regardless of the absolute value $|I_o - I_o^*|$ of any exciting current variation in a range of $|\dot\theta| > \dot\theta_B$.

$$\left[ r_s I_o + \left( l_m + l_r \frac{r_s}{r_r} \right) \frac{1}{T} |I_o - I_o^*| \right]^2 - (r_s I_o)^2 < \alpha^2 \quad (37)$$

When equations (37) and (38) hold, the condition of equation (35) is satisfied. Because when equation (36) is substituted into equation (37) we can obtain the following relation.

$$\left[ r_s I_o + \left( l_m + l_r \frac{r_s}{r_r} \right) \frac{1}{T} |I_o - I_o^*| \right]^2 + \quad (38)$$

$$\left[ l_m I_o |\dot\theta| + \left( \frac{l_m}{l_r} r_r + r_s \right) I_{2m} \right]^2 < \frac{4}{3} E^2$$

which means that the following relations always hold.

$$\left[ r_s I_o + \left( l_m + l_r \frac{r_s}{r_r} \right) \frac{1}{T} (I_o - I_o^*) \right]^2 \leq \quad (39)$$

$$\left[ r_s I_o + \left( l_m + l_r \frac{r_s}{r_r} \right) \frac{1}{T} |I_o - I_o^*| \right]^2$$

$$\left[ l_m I_o \dot\theta + \left( \frac{l_m}{l_r} r_r + r_s \right) I_{2m} \right]^2 \leq \quad (40)$$

$$\left[ l_m I_o |\dot\theta| + \left( \frac{l_m}{l_r} r_r + r_s \right) I_{2m} \right]^2$$

It can be understood that equation (35) can be derived out from equations (38), (39) and (40).

Regarding the value of $\alpha^2$ in equation (37), equation (36) shows that as $\alpha^2$ decreases voltage $$\frac{2}{\sqrt{3}} E$$

which is the maximum limit of the power amplifiers can be applied to the induction motor, thereby increasing the efficiency. For this reason, it can be understood from equation (37) that smaller values of $|I_o - I_o^*|$ are preferred. Since current $I_o$ is controlled so as to always satisfy equation (36), $|I_o - I_o|$ corresponds to a function of the rate of change $$\frac{d|\dot\theta|}{dt}$$

of the motor speed, the function can be obtained as follows. More particularly, by differentiating the both sides of equation (36) with reference to time t we obtain $$2 r_s^2 I_o \frac{dI_o}{dt} + 2 l_m \left[ l_m I_o |\dot\theta| + \quad (36)'$$

$$\left( \frac{l_m}{l_r} r_r + r_s \right) I_{2m} \right] \left[ |\dot\theta| \frac{dI_o}{dt} + I_o \frac{d|\dot\theta|}{dt} \right] = 0$$

By substituting $$\frac{dI_o}{dt} = \frac{I_o - I_o^*}{T}$$

into equation (36)' we obtain $$\frac{d|\dot\theta|}{dt} = \quad (36)''$$

-continued $$\frac{r_s^2 I_o + l_m|\dot{\theta}|\left[l_m I_o|\dot{\theta}| + \left(\frac{l_m}{l_r} r_r + r_s\right) I_{2m}\right]}{l_m I_o\left[l_m I_o|\dot{\theta}| + \left(\frac{l_m}{l_r} r_s + r_r\right) I_{2m}\right]} \cdot \frac{(I_o - I_o^*)}{T}$$

Consequently, the absolute value of $$\frac{d|\dot{\theta}|}{dt}$$

can be expressed as follows.

$$\left|\frac{d|\dot{\theta}|}{dt}\right| = \tag{41}$$

$$\left\{\frac{r_s^2}{l_m\left[l_m I_o|\dot{\theta}| + \left(\frac{l_m}{l_r} r_r + r_s\right) I_{2m}\right]} + \frac{|\dot{\theta}|}{I_o}\right\} \frac{|I_o - I_o^*|}{T}$$

As an example, the limiting value of the acceleration $$\left|\frac{d|\dot{\theta}|}{dt}\right|$$

was calculated by substituting into equation (42) the following constants of a two pole three phase standard induction motor having a rating of 3.7 KW, 200 V and 14.6A.

$$\left.\begin{array}{l} r_s = 0.368 \text{ ohm} \\ r_r = 0.457 \text{ ohm} \\ l_s = l_r = 0.061 \ (H) \\ l_m = 0.059 \ (H) \\ I_{oB} = 7.4 \text{ Amp.} \\ I_{2m} = 18.8 \text{ Amp.} \\ E = 141 \text{ volts} \end{array}\right\} \tag{42}$$

In this example, $\alpha = 10$ V was selected. Substitution of $I_o = I_{oB} = 7.4$ Amp into equation (36) results in $|\dot{\theta}| = 337$ (rad/sec) = 3220 rpm meaning that the base speed should be $\dot{\theta}_B = 337$ (rad/sec).

When the following equation (B) holds under any condition, equation (37) described above would always hold.

$$\frac{|I_o - I_o^*|}{T} < \frac{\sqrt{(r_s I_o)^2 + \alpha^2} - r_s I_o}{l_m + l_r \frac{r_s}{r_r}} \tag{B}$$

The righthand side of equation (B) decreases as the positive exciting current $I_o$ when $\alpha = 10$ V is constant. Thus, the righthand term becomes a minimun when $I_o = I_{oB}$ and equation (37) always holds when $$\frac{|I_o - I_o^*|}{T} < \frac{\sqrt{(r_s I_{oB})^2 + \alpha^2} - r_s I_{oB}}{l_m + l_r \frac{r_s}{r_r}} = \tag{43}$$

-continued $$\frac{\sqrt{(0.368 \times 7.4)^2 + 10^2} - 0.368 \times 7.4}{0.059 + 0.061 \times \frac{0.368}{0.457}} = 70.64 \ (A/\text{sec})$$

Furthermore, the coefficient of the righthand side of equation (41) can be calculated as follows from equation (36).

$$\frac{r_s^2}{l_m\left[l_m I_o|\dot{\theta}| + \left(\frac{l_m}{l_r} r_r + r_s\right) I_{2m}\right]} + \frac{|\dot{\theta}|}{I_o} = \tag{C}$$

$$\frac{r_s^2}{l_m \sqrt{\frac{4}{3} E^2 - \alpha^2} - (r_s I_o)^2} + \frac{|\dot{\theta}|}{I_o}$$

This first term of the righthand side of this equation (C) becomes a minimum value $$\frac{0.368}{0.059 \sqrt{\frac{4}{3} \times 141^2 - 10^2}} = 0.014 \ (\text{rad/sec}/A)$$

when $I_o = 0$, whereas the second term $$\frac{|\dot{\theta}|}{I_o}$$

becomes $|\dot{\theta}| = \dot{\theta}_B$, and assumes a minimum value $\dot{\theta}_B/I_{oB} = 337/7.4 = 45.541$ (rad/sec/A). Thus, the following equation (44) holds at any time.

$$\frac{r_s^2}{l_m\left[l_m I_o|\dot{\theta}| + \left(\frac{l_m}{l_r} r_r + r_s\right) I_{2m}\right]} + \frac{|\dot{\theta}|}{I_o} > \tag{44}$$

$$0.014 + 45.541 = 45.555 \ (\text{rad/sec}/A)$$

Let us denote the acceleration in equation (41) by $$\left|\frac{d|\dot{\theta}|}{dt}\right| = 45.555 \times 70.64 = 3218 \ (\text{rad/sec}^2)$$

$$= 30729 \text{ rpm/sec,}$$

from equation (41) the following equation can be derivated out.

$$\frac{|I_o - I_o^*|}{T} = \tag{D}$$

$$\frac{45.555}{\dfrac{r_s^2}{l_m\left[l_m I_o|\dot{\theta}| + \left(\dfrac{l_m}{l_r} r_r + r_s\right) I_{2m}\right]} + \dfrac{|\dot{\theta}|}{I_o}} \times 70.64$$

From equations (D) and (44) we can obtain a relation $$\frac{|I_o - I_o^*|}{T} < 70.64 \ (A/\text{sec})$$

meansing that equation (43) always holds.

In other words, as long as the acceleration $$\left|\frac{d|\dot\theta|}{dt}\right|$$

is less than 3218 rad/sec.$^2$, $$\frac{|I_o - I_o^*|}{T}$$

is always smaller than 70.64 A/sec. whereby equation (43) holds and hence also equation (37) holds, thus making $\alpha$ in equation (36) to be equal to 10 V. Since, in usual applications, acceleration scarcely exceeds 3218 rad./sec. = 30729 rpm/sec., where the constants of the induction motor are shown by equation (42), the embodiment 3 can utilize the full rating of the induction motor.

Where a suitable $\alpha$ is determined as above described, in embodiment 3, the motor speed $|\dot\theta|$ is firstly detected and when $|\dot\theta|$ is less than the base speed $\dot\theta_B$, the exciting current $I_o$ is maintained at a constant value $I_{oB}$, whereas $|\dot\theta|$ is larger than $\dot\theta_B$ current $I_o$ is determined according to equation (36). With the constants shown in equation (42), the first term $(r_sI_o)^2$ of the left hand side of equation (36) becomes a maximum when $I_o=I_{oB}=7.4$ A, which is equal to $(0.368 \times 7.4)^2 = 7.4$. However, since this value is much smaller than the righthand term $$\frac{4}{3}E^2 - \alpha^2 = \frac{4}{3} \times 141^2 - 10^2 = 26408$$

of equation (36), where the constants are given by equation (42), equation (36) can be simplified as follows by neglecting the first term $(r_sI_o)^2$.

$$l_m I_o |\dot\theta| = \sqrt{\frac{4}{3}E^2 - \alpha^2} - \left(\frac{l_m}{l_r}r_r + r_s\right)I_{2m} \quad (45)$$

However, in an application where $r_s$ is large (for example, where a series resistance is inserted between the primary of the induction motor and the power amplifiers for smoothly controlling the exciting current $I_o$ near $\phi=0$ by varying the voltage) it is necessary to determine $I_o$ more accurately with equation (36).

An equation for calculating current $I_o$ for a speed $|\dot\theta|$ can be derived out as follows from equation (36).

$$(r_s^2 + l_m^2|\dot\theta|^2)I_o^2 + 2l_m\left(\frac{l_m}{l_r}r_r + r_s\right)I_{2m}|\dot\theta|I_o + \quad (46)$$

-continued $$\left(\frac{l_m}{l_r}r_r + r_s\right)^2 I_{2m}^2 + \alpha^2 - \frac{4}{3}E^2 = 0$$

Hence $$I_o = \frac{1}{r_s^2 + l_m^2|\dot\theta|^2} \times \left[-l_m\left(\frac{l_m}{l_r}r_r + r_s\right)I_{2m}|\dot\theta|\right] + \quad (46)$$

$$\sqrt{\left[l_m\left(\frac{l_m}{l_r}r_r + r_s\right)I_{2m}|\dot\theta|^2\right] + [r_s^2 + l_m^2|\dot\theta|^2]\left[\frac{4}{3}E^2 - \left(\frac{l_m}{l_r}r_r + r_s\right)^2 I_{2m}^2 - \alpha^2\right]}$$

Since in this embodiment, E, $I_{2m}$ and $\alpha$ are such that $$\frac{4}{3}E^2 - \left(\frac{l_m}{l_r}r_r + r_s\right)^2 I_{2m} - \alpha^2$$

would be positive, the current $I_o$ obtained with equation (46) would not be always a real number.

Figure 13:
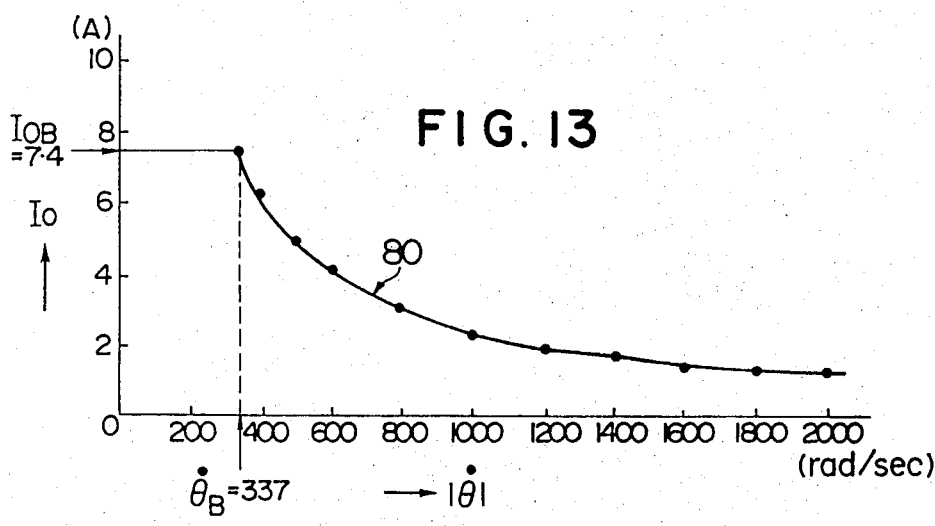
FIG. 13 shows a characteristic curve for explaining the operation of the second embodiment.

Curve 80 shown in FIG. 13 shows a relationship between the motor speed $|\dot\theta|$ and the exciting current $I_o$ calculated according to equation (46) when the constants of the motor are given by equation (42). It will be noted that curve 80 is substantially equal to that inversely proportional to equation (45). The detail of embodiment 3 will be described with reference to FIG. 14, which is identical to the previous embodiments 1 and 2 except a block 81 acting as a computor.

In this embodiment 3 too, each time a sampling pulse SP having a period of T=1/1000 sec. is received, a program control unit 100 sequentially executes the following programs for steps 1 to 8.

More particularly, as the program for step 1 is executed, the computor 81 writes the count $$\frac{8192}{2\pi}\theta$$

of the reversible counter 7 and multiplies this data with a coefficient $2\pi/8192$ with a coefficient applicator 107 to form data $\theta$.

Then, the program of step 2 is executed to differentiate data $\theta$ by a differentiator 108 to obtain data $\dot\theta$. Then, the program of step 3 is executed to obtain the absolute value $|\dot\theta|$ of $\dot\theta$ by an absolute value calculator 109, and an $I_o$ calculator 110 calculates $I_o$ based on $|\dot\theta|$. Thus, the $I_o$ calculator 110 calculates $I_o$ from $|\dot\theta|$ according to equation (46) described above for producing $I_o$ obtained by equation (46) as the output data $I_o$ of the $I_o$ calculator 110 when $I_o$ is smaller than a constant value $I_{oB}$, whereas the $I_o$ is larger than the constant value $I_{oB}$ the constant value $I_{oB}$ is produced as the output data $I_o$ of the $I_o$ calculator 110.

Then, the program of step 4 is executed and a digital data $I_2'$ produced by a current data instructor 51 is written into the computor 81 to form rotor current data $I_2$ with its value limited to $\pm I_{2m}$ by a limiter 106, the limit $I_{2m}$ corresponding to the constant $I_{2m}$ in equation (36).

Then, the program of step 5 is executed in which current $I_2$ obtained by step 4 is divided by current $I_o$ obtained by step 3 in a divider 111 to form data $I_2/I_o$ which is multiplied with a coefficient $r_r/l_r$ in a coefficient applicator 112 to form data $$\frac{r_r}{l_r} \frac{I_2}{I_o}.$$

Then, the program of step 6 is executed to integrate data $$\frac{r_r}{l_r} \frac{I_2}{I_o}$$

obtained by step 5 with an integrator 113 to obtain data $\phi - \theta$. Thus, an equation $$\phi - \theta = \int \frac{r_r}{l_r} \frac{I_2}{I_o} dt$$

in equation (20) is calculated. This data $\phi - \theta$ is added to the data $\theta$ obtained in step 1 with an adder 85 to form data $\phi$ which corresponds to the flux angle $\phi$ in the voltage equation (32).

Then, the program of step 7 is executed in which a trigonometric function generator 99 calculates trigonometric functions $\cos \phi$, $\sin \phi$, $$\cos\left(\phi - \frac{2\pi}{3}\right), \sin\left(\phi - \frac{2\pi}{3}\right)$$

based on the flux angle $\phi$ obtained in step 6.

Then, the program of step 8 is executed in which data $I_o$ obtained in step 3 is differentiated with a differentiator 114 to obtain data $dI_o/dt$ which can be calculated by an equation $$\frac{dI_o}{dt} = \frac{I_o - I_o^*}{T}$$

where $I_o^*$ represents the current obtained at the time of previous sampling. The data $dI_o/dt$ is multiplied with a coefficient $$\left(l_m + l_r \frac{r_s}{r_r}\right)$$

in a coefficient applicator 117 to form data $$\left(l_m + l_r \frac{r_s}{r_r}\right) \frac{dI_o}{dt}.$$

Then, the program of step 9 is executed in which data $I_o$ obtained in step 3 is multiplied with a coefficient $r_s$ in a coefficient applicator 118 to form data $r_s I_o$ which is added to data $$\left(l_m + l_r \frac{r_s}{r_r}\right) \frac{dI_o}{dt}$$

obtained in step 8 with an adder 87 to form data $$r_s I_o + \left(l_m + l_r \frac{r_s}{r_r}\right) \frac{dI_o}{dt}$$

which corresponds to the amplitude value of the cosine function in the first term on the righthand side of the voltage equation (32).

Then, the program of step 10 is executed in which data $\dot{\theta}$ obtained in step 2 is added to data $$\frac{r_r}{l_r} \frac{I_2}{I_o}$$

in an adder 86 to obtain data $\dot{\phi}$. Thus, $$\dot{\phi} = \dot{\theta} + \frac{r_r}{l_r} \frac{I_2}{I_o}$$

in equation (33) is calculated.

Data $\dot{\phi}$ is multiplied with data $I_o$ obtained in step 3 in a multiplier 101 to form data $l_M I_o \dot{\phi}$.

Then, the program of step 11 is executed in which data $I_2$ obtained in step 4 is multiplied with a coefficient $r_s$ in a coefficient applicator 116 to form data $r_s I_2$ which is added to data $l_M I_o \dot{\phi}$ obtained in step 10 in an adder 88 to obtain data $l_m I_o \dot{\phi} + r_s I_2$ which represents the amplitude value of the sine function in the second term on the righthand side of the voltage equation (32).

Then, the program of step 12 is executed in which functions $\cos \phi$, $\sin \phi$, $$\cos\left(\phi - \frac{2\pi}{3}\right), \sin\left(\phi - \frac{2\pi}{3}\right), \text{ data } r_s I_o +$$

$$\left(l_m + l_r \frac{r_s}{r_r}\right) \frac{dI_o}{dt}$$

and $l_m I_o \dot{\phi} + r_s I_2$ obtained in step 11 are used to process $V_a - V_N$ and $V_b - V_N$ in equation (32) in the following manner by using multipliers 102, 103, 104 and 105 and subtractors 89 and 90.

$$V_a - V_N = \left[r_s I_o + \left(l_m + l_r \frac{r_s}{r_r}\right) \frac{dI_o}{dt}\right] \cos\phi - (l_m I_o \dot{\phi} + r_s I_2)\sin\phi \qquad (47)$$

$$V_b - V_N = \left[r_s I_o + \left(l_m + l_r \frac{r_s}{r_r}\right) \frac{dI_o}{dt}\right] \cos\left(\phi - \frac{2\pi}{3}\right) - (l_m I_o \dot{\phi} + r_s I_2)\sin\left(\phi - \frac{2\pi}{3}\right)$$

Then, the program of step 13 is executed in which $V_a - V_N$ and $V_b - V_N$ obtained in step 12 are respectively multiplied with a constant coefficient 2048/E in coefficient applicators 119 and 120 to obtain data $V_a^*$ and $V_b^*$ which are subtracted with each other in an adder 91 to form $V_C = -(V_a + V_b^*)$. In this embodiment 3, the amplitude value $$\sqrt{\left[r_s I_o + \left(l_m + l_r \frac{r_s}{r_r}\right) \frac{dI_o}{dt}\right]^2 + [l_m I_o \phi + r_s I_2]^2}$$

of $V_a - V_N$, $V_b - V_N$ and $V_c - V_N$ in equation (32) is always limited to be less than $$\frac{2}{\sqrt{3}} E$$

so that these data $V_a^*$, $V_b^*$ and $V_c^*$ lie in a range of from $$-\frac{2}{\sqrt{3}} \times 2048 \text{ to } +\frac{2}{\sqrt{3}} \times 2047.$$

Then, the program of step 14 is executed and the same processing is made as has been described in connection with the embodiment 2 so as to calculate the output data $V_a'$, $V_b'$, and $V_c'$ of the computer 81. As has already been described in embodiment 2, these output data always lie in a range of from $-2048$ to $+2047$ and are written into the 3 pairs of 12 bit holding registers 39A, 39B and 39C respectively in the PWM circuit 38 shown in embodiment 1.

Figure 14:
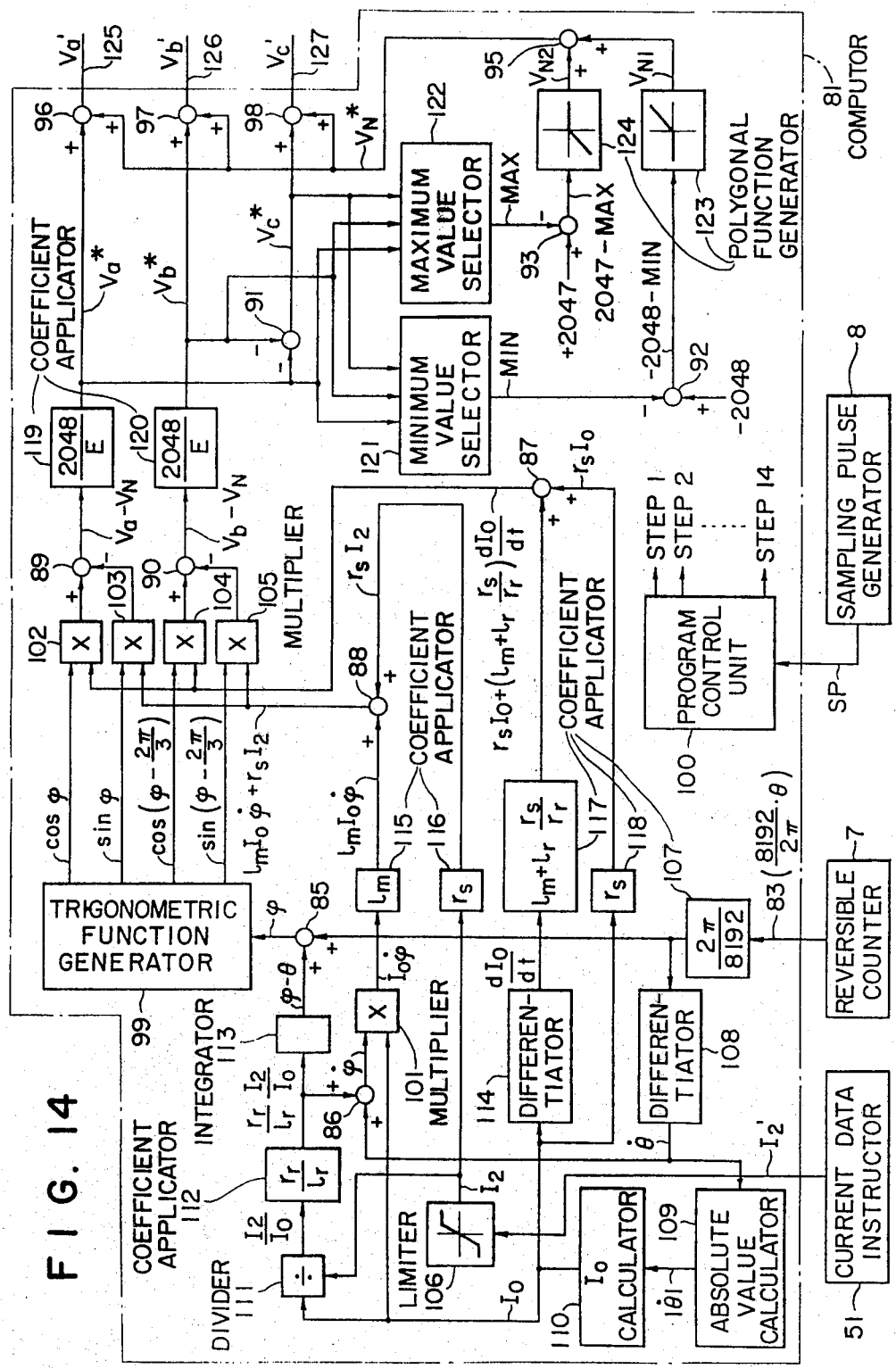
FIG. 14 is a block diagram showing a third embodiment of this invention.

In the foregoing, the process of calculating the voltage values in the voltage equations (32) with the computor 81 shown in FIG. 14 has been described.

EMBODIMENT 4

(Speed control)

Since in the embodiments 1 and 2, the exciting current $I_o$ was held constant, the output torque $T_e$ of the induction motor is precisely proportional to the instructed torque $I_2$, as can be noted from equation (17). Thus, when the torque control device utilized in embodiments 1 and 2 is applied to a speed control device the control system operates on the principle of a linear automatic control, thus enabling to realize a quick response speed control system intended by a designer.

Figure 15:
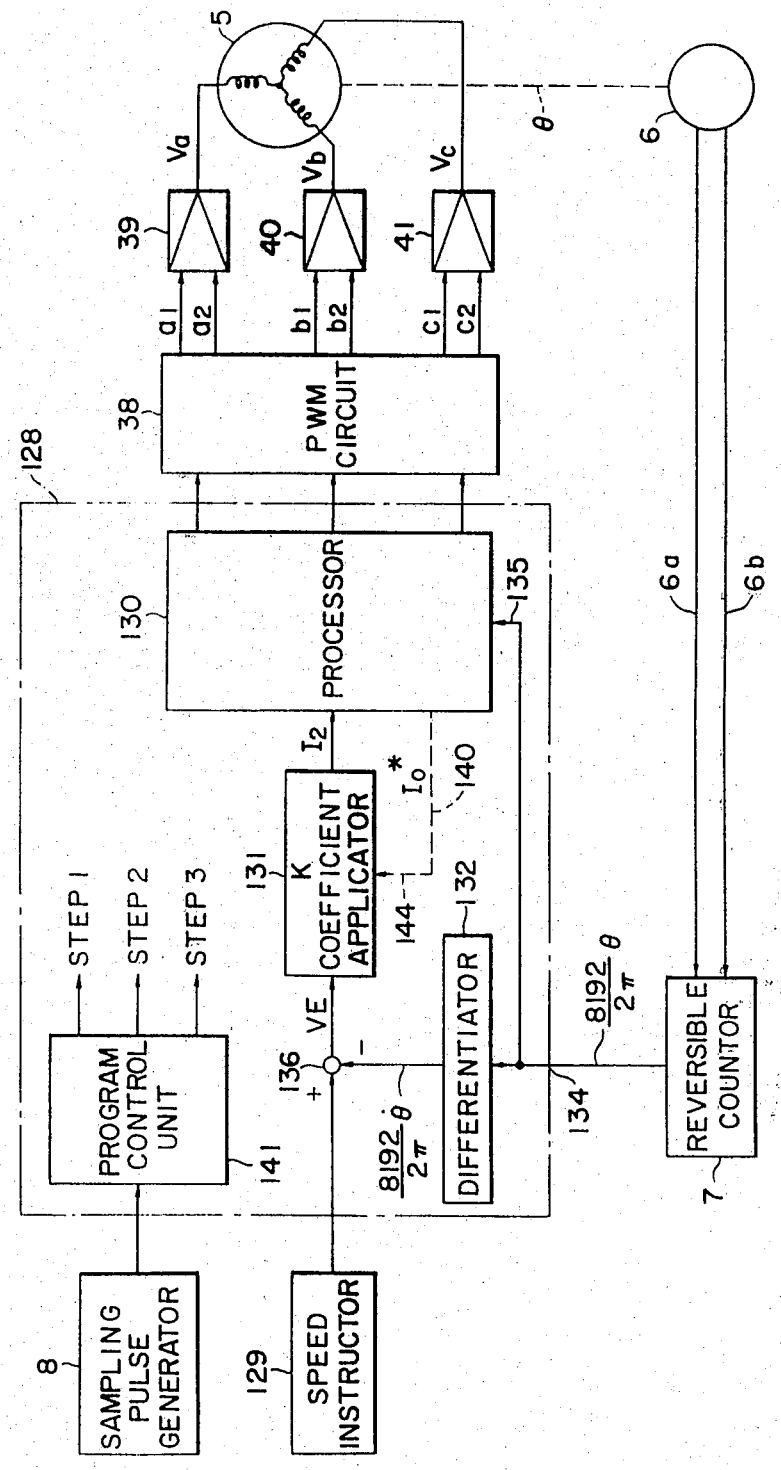
FIG. 15 is a block diagram showing a fourth embodiment of this invention.

FIG. 15 shows a detail of one example of the speed control apparatus. In this embodiment too, the construction of the apparatus is identical to that of the embodiment shown in FIG. 16 except a computor 128 and a speed instructor 129. Each time a sampling pulse SP generated by a sampling pulse generator 8 at a period of $T = 1/1000$ sec. is applied to the computor 128, a program control unit 141 sequentially executes the programs of steps 1 to 3 to be described hereinafter.

At first when the program of step 1 is executed, the count $$\frac{8192}{2\pi} \theta$$

of the reversible counter 7 is written into the computor 128 and this data is differentiated by a differentiator 132 to obtain an output data $$\frac{8192}{2\pi} \dot{\theta}$$

which is calculated according to the following equation.

$$\frac{2192}{2\pi} \dot{\theta} = \frac{1}{T}\left\{\left[\frac{8192}{2\pi} \theta\right] - \left[\frac{8192}{2\pi} \theta\right]^*\right\} \quad (48)$$

where $$\frac{8192}{2\pi} \theta$$

represents the count of the reversible counter 7 at a given sampling time and $$\left[\frac{8192}{2\pi} \theta\right]^*$$

that of one period before. However, since the capacity of the reversible counter 7 is only two step 13 bits in this example, its count $$\frac{8192}{2\pi} \theta$$

corresponds to one of 0 to 8191. More particularly as the motor rotates in the forward direction and $\theta$ increases from zero, the count of the counter 7 also increases from 0 and reaches 8191 at a point a little smaller than $\theta = 2\pi$ rad. (one revolution of the motor) at which the count of the counter 7 returns again to zero. Thus, as $\theta$ increases beyond $\theta = 2\pi$ radians the count of the counter increases again from 0. In other words, the count of the counter digitally represents the angle of rotation $\theta$ of the motor in less than one revolution, but the content of the count during the second and the succeeding revolutions is the same as that in the first revolution. For this reason, the result of calculation of equation (47) is not accurate in certain cases. For example, when the position $\theta$ of the rotor at the time of previous sampling is $$\frac{2\pi}{8192}$$

(8000) radians and when that of the given sampling time is $$\frac{2\pi}{8192}$$

(8200) radians, the count of the counter 7 at the time of the previous sampling would be $$\left[\frac{8192}{2\pi} \theta\right]^* = 8000,$$

whereas that of the given time would be $$\left[\frac{8192}{2\pi} \theta\right] = 8200 - 8192 = 8.$$

When this value is substituted into equation (17) the result would be $$\frac{8192}{2\pi} \dot{\theta} = \frac{1}{T} [8 - 8000]$$

which means that the speed $$\frac{8192}{2\pi} \dot{\theta}$$

is negative irrespective of the fact that $\theta$ is increasing in the positive direction. If the maximum variation of $\theta$ during one period $T=1/1000$ sec. were less than $\pm\pi$ rad. when the result of calculation of the term $$\left[\frac{8192}{2\pi} \theta\right] - \left[\frac{8192}{\pi} \theta\right]^*$$

lies in a range of from $-4090$ to $+4095$, the result is correct, and other results are not correct. Accordingly, when the speed data $$\frac{8192}{2\pi} \dot{\theta}$$

is calculated according to the following equations the results are correct.

$$\begin{aligned}
&(1) \text{ When } -4096 \leq \left[\frac{8192}{2\pi}\theta\right] - \left[\frac{8192}{2\pi}\theta\right]^* \leq +4095, \\
&\frac{8192}{2\pi}\dot{\theta} = \frac{1}{T}\left(\left[\frac{8192}{2\pi}\theta\right] - \left[\frac{8192}{2\pi}\theta\right]^*\right) \\
&(2) \text{ When } \left[\frac{8192}{2\pi}\theta\right] - \left[\frac{8192}{2\pi}\theta\right]^* < -4096, \\
&\frac{8192}{2\pi}\dot{\theta} = \frac{1}{T}\left(\left[\frac{8192}{2\pi}\theta\right] - \left[\frac{8192}{2\pi}\theta\right]^* + 8192\right) \\
&(3) \text{ When } +4095 < \left[\frac{8192}{2\pi}\theta\right] - \left[\frac{8192}{2\pi}\theta\right]^*, \\
&\frac{8192}{2\pi}\dot{\theta} = \frac{1}{T}\left(\left[\frac{8192}{2\pi}\theta\right] - \left[\frac{8192}{2\pi}\theta\right]^* - 8192\right)
\end{aligned} \quad (49)$$

By using equations (49) correct speed data $$\frac{8192}{2\pi} \dot{\theta}$$

can be obtained with differentiator 132 thus obtaining data proportional to the actual speed $\dot{\theta}$ (rad./sec.) of the motor 5.

Then, the program of step 2 is executed in which a data R from the speed instructor 129 is written into the computer 128, the data R being subtracted by a correct feedback data $$\frac{8192}{2\pi} \dot{\theta}$$

obtained in step 1 in subtractor 136 to produce a speed error data VE. The speed error data VE is multiplied by a constant coefficient K by a coefficient applicator 131. In this case, data $I_o{}^*$ applied to the other input of the coefficient applicator 131 is not used. The data $I_2$ is applied to a block 130 which is identical to block 10 shown in FIG. 6 of embodiment 1 or computer 69 shown in FIG. 12 of the embodiment 2. Thus, in FIG. 15 data $I_2$ applied to block 130 corresponds to the torque data $I_2$ shown in FIG. 6 and FIG. 12 and data $$\left[\frac{8192}{2\pi}\theta\right]$$

applied to the other input terminal 135 corresponds to the count $$\frac{8192}{2\pi} \theta$$

of the reversible counter shown in FIG. 6 or the count $8192/2\pi$ of the reversible counter shown in FIG. 12.

Then, when the program control unit 141 executes the step 3 of the program, the block 130 performs the same calculation as that described in embodiment 1 or 2. Thus, the block 130 calculates the motor control voltage data based on the torque data $I_2$ and the count $$\frac{8192}{2\pi} \theta$$

of the reversible counter and applies the calculated motor control voltage data to the PWM circuit 38. In this manner, the induction motor 5 produces a torque $T_e$ precisely proportional to data $I_2$ applied to the computer.

In FIG. 15, where the instructed speed data R is larger than the actual motor speed data $$\frac{8192}{2\pi} \dot{\theta},$$

the speed error VE is positive and the motor 5 produces a torque $T_e$ proportional to VE. Thus, the motor accelerates and its actual speed is fed back to the control apparatus to make zero the speed error VE. In this manner, a speed control system based on the linear automatic control theory can be provided in which the speed is controlled such that the amount of feedback $$\frac{8192}{2\pi} \dot{\theta}$$

proportional to the motor speed will coincide with the instructed speed data R.

The torque control system of the third embodiment in which the exciting current $I_o$ is decreased when the motor speed increases beyond the base speed $\dot{\theta}_B$ is also applied to the speed control system shown in FIG. 15. In this case, the construction of block 130 shown in FIG. 15 is identical to that of the computer 81 of the torque control system of the third embodiment shown in FIG. 14. Thus, the data $I_2$ applied to block 130 corresponds to data $I_2'$ applied to block 81 shown in FIG. 14, data $$\frac{8192}{2\pi} \theta$$

to $$\left[\frac{8192}{2\pi}\theta\right]$$

shown in FIG. 14, and the outputs of the block 130 correspond to $V_a'$, $V_b'$ and $V_c'$ shown in FIG. 14.

In embodiment 3, the output torque $T_e$ of the motor shown in FIG. 15 is shown by $$T_e = K_T \frac{l_m^2}{l_r} I_o I_2$$

as shown by equation (17). Assuming that the coefficient applied by coefficient applicator 131 shown in FIG. 15 is a constant K, then $I_2 = KV_E$ and the output torque of the induction motor becomes $$T_e = K_T \frac{l_m^2}{l_r} I_o K V_E.$$

Since the open loop gain G of the speed control system is determined by $T_e/V_E$ when $I_o$ decreases at a speed higher than the base speed $\dot{\theta}_B$ the gain decreases as expressed by an equation $$G = T_e/V_E = \frac{K_T \frac{l_m^2}{l_r} I_o K V_E}{V_E} = K K_T \frac{l_m^2}{l_r} I_o$$

whereby the response speed of the automatic control system decreases at speeds above the base speed $\dot{\theta}_B$.

For this reason, the coefficient K applied by the coefficient applicator 131 is changed in accordance with data $I_o^*$. More particularly, K is made to be equal to $K_o/I_o$ where $K_o$ is a constant and $I_o^*$ represents a calculated value of $I_o$ calculated by the $I_o$ calculator 110 shown in embodiment 3 at a previous sampling time. $I_o^*$ is applied to an input terminal 144 of the coefficient applicator 131 via a dotted line conductor 140 to change K to $K_o/I_o^*$.

In this manner, the open loop gain $$G = K K_T \frac{l_m^2}{l_r} I_o = K_o K_T \frac{l_m^2}{l_r} \frac{I_o}{I_o^*}$$

becomes a constant value, because $I_o^*$ one sampling time before and $I_o$ at the present time are substantially equal. Thus, at any motor speed $\dot{\theta}$ the gain is constant and the response speed does not decrease.

In this embodiment, it was described that the torque control system of the embodiments 1, 2 and 3 can be used for the speed control. However, it should be understood that the invention is not limited to speed control but is also applicable to position control as will be described hereunder.

EMBODIMENT 5
(position control device)

Figure 16:
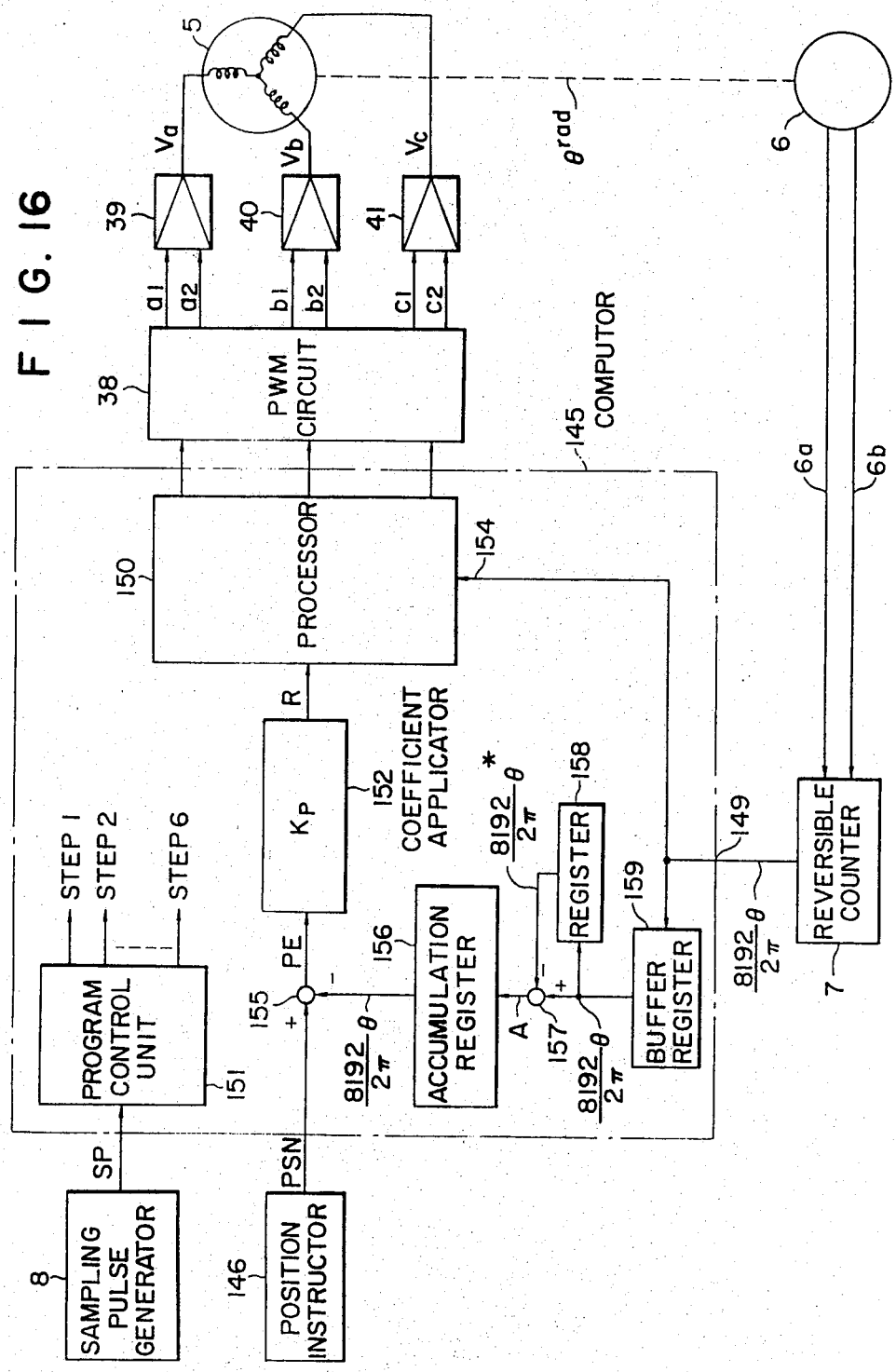
FIG. 16 is a block diagram showing a fifth embodiment of this invention.

FIG. 16 is a block diagram showing one example of the position control device in which block 145 designates a computor. A position instructor 146 applies a position instruction PSN to the computor 145. Where a digital control system is employed, the position instructor 146 may be incorporated into the computor in which case the position instructor 146 is constructed to produce a linear or an arcuate function in the computor 145.

In the circuit shown in FIG. 16, circuit elements other than the computor 145 and the data instructor 146 are identical to those of the speed control system of the embodiment 4.

Each time a sampling pulse SP is applied to the computor 145 from a sampling pulse generator 8 at a period of 1/1000 second the program control unit 151 executes the programs of steps 1 to 6 in the following manner.

At first, when the program of step 1 is executed, the computor 145 takes in the count $$\left[\frac{8192}{2\pi}\theta\right]$$

of the reversible counter 7 to temporarily store it in a buffer register 159. However, as has been described in connection with embodiment 4, the content $$\left[\frac{8192}{2\pi}\theta\right]$$

represents the rotation angle $\theta$ in less than one revolution in terms of digital quantities, the count of the second and the succeeding revolutions are the same as that of the first revolution. Accordingly, in order to cause an accumulating register 156 to produce a position data output $$\frac{8192}{2\pi}\theta$$

which accurately represents the rotational angle $\theta$ of the motor during any revolutions the following procedures are performed.

Thus, as the program control unit 151 performs the program of step 2, a subtractor 157 produces an output A by performing calculations according to the following equations based on the content of a register 158 storing the content $$\left[\frac{8192}{2\pi}\theta\right]^*$$

of a buffer register 159.

$$\begin{aligned}
&(1)\ \text{When } -4096 \leq \left[\frac{8192}{2\pi}\theta\right] - \left[\frac{8192}{2\pi}\theta\right]^* \leq +4095, \\
&\qquad A = \left[\frac{8192}{2\pi}\theta\right] - \left[\frac{8192}{2\pi}\theta\right]^* \\
&(2)\ \text{When } \left[\frac{8192}{2\pi}\theta\right] - \left[\frac{8192}{2\pi}\theta\right]^* < -4096 \\
&\qquad A = \left[\frac{8192}{2\pi}\theta\right] - \left[\frac{8192}{2\pi}\theta\right]^* + 8192 \\
&(3)\ \text{When } 4095 < \left[\frac{8192}{2\pi}\theta\right] - \left[\frac{8192}{2\pi}\theta\right]^* \\
&\qquad A = \left[\frac{8192}{2\pi}\theta\right] - \left[\frac{8192}{2\pi}\theta\right]^* - 8192
\end{aligned} \quad (50)$$

Then, the program of step 3 is executed in which data A obtained in step 2 is added to the content $$\frac{8192}{2\pi} \theta$$

of the accumulation register 156 at the previous sampling time, thus forming a new content $$\frac{8192}{2\pi} \theta$$

at the new sampling point. This valve shows an accumulated value of the motor positions, thus showing the actual angular position of the rotor of the motor. The accumulation register 156 has been cleared to zero when a power source switch, not shown, is closed and since the capacity of the register 156 is sufficiently large enough to cover the maximum position of the variation of the rotor angular position of the motor the register 156 can accumulate position data corresponding to all angular positions at a ratio of 1:1.

Then the program of step 4 is executed in which the content of the buffer register 159 accumulated in step 1 is transferred to register 158. The content thereof is used as the previous content, $$\left[\frac{8192}{2\pi} \theta\right]^*$$

of the reversible counter 7 at the time of the next sampling.

Then the program of the step 5 is executed in which a position instruction digital quantity PSN is applied to the computer 145 from the position instructor 146 of the position control device, the instructed quantity PSN being subtracted by feedback data $$\frac{8192}{2\pi} \theta$$

obtained in step 3 in a subtractor 155 to produce a position error data PE, which is multiplied with a constant coefficient KP in the coefficient applicator 152. This data R is applied to a block 150 in the computer 145, having the same construction as the processor 128 of the speed control system of embodiment 4.

Then the program of the step 6 is executed by the program control unit in which the processor 150 performes the same calculation as has been described in connection with the speed control of embodiment 4 so as to calculate the motor control voltage data based on data R and the data $$\frac{8192}{2\pi} \theta$$

of the reversible counter, the motor control voltage data being supplied to the PWM circuit 38. As has been described in connection with the embodiment 4 the speed data $$\frac{8192}{2\pi} \dot{\theta}$$

is controlled such that it will coincide with data R applied to block 150.

In the circuit shown in FIG. 16, when the instructed position data PSN is larger than the actual motor position data $$\frac{8192}{2\pi} \theta$$

the position error PE is positive and the motor rotates with a positive speed whereby the motor position data $$\frac{8192}{2\pi} \theta$$

increases in the positive direction to provide a feedback which reduces the position error PE to zero. In this manner, the angular position of the motor is controlled such that its position data $$\frac{8192}{2\pi} \theta$$

coincides with the instructed position data PSN.

I claim:

1. A torque control system of an induction motor having m phase stator windings and P poles, comprising means for producing a predetermined torque instruction, and means responsive to said torque instruction for generating and applying a phase n voltage $V_{ns}$ expressed by the following equation to the stator windings of said induction motor to cause it to produce a torque corresponding to said torque instruction, $$V_{ns} = r_s I_o \cos\left(\phi - \frac{2(n-1)}{m}\pi\right) - \left(l_m I_o \frac{d\phi}{dt} + r_s I_2\right) \sin\left(\phi - \frac{2(n-1)}{m}\pi\right)$$

where $$\phi = \frac{P}{2}\theta + \frac{r_r}{l_r I_o} \int I_2 dt \text{ (radian)},$$

m: number of phases equal to 2 or more,
n: 1, 2, . . . m,
p: number of poles of the induction motor,
$I_o$: constant exciting current of the stator windings (ampere),
$r_s$, $r_r$, $l_r$ and $l_m$: constants inherent to the induction motor,
$\theta$: rotor rotating angle (radian) of the induction motor, and
$I_2$: instructed rotor current (ampere) corresponding to the torque instruction.

2. A torque control system of an induction motor having m phase stator windings and P poles, comprising means for producing a predetermined torque instruction, means responsive to said torque instruction for generating and applying a phase n voltage $V_{ns}$ expressed by the following equation (1) to the stator windings of said induction motor to cause it to generate a torque corresponding to said torque instruction $$V_{ns} = \sqrt{(r_s I_o)^2 + \left(l_m I_o \frac{d\phi}{dt} + r_s I_2\right)^2} \cos\left(\phi - \frac{2(n-1)}{m}\pi\right) \tag{1}$$

and means for controlling a term $V_o$ in the following equation (2) so as to make said phase voltage $V_n$ to be equal to a permissible maximum value when said phase voltage exceeds said permissible maximum value, $$V_{ns} = \tag{2}$$

$$\sqrt{(r_s I_o)^2 + \left(l_m I_o \frac{d\phi}{dt} + r_s I_2\right)^2} \cos\left(\phi - \frac{2(n-1)}{m}\pi\right) + V_o$$

where $$\phi = \frac{P}{2}\theta + \frac{r_r}{l_r I_o}\int I_2 dt \text{ (radians)},$$

$I_o$: constant exciting current (ampere) of the stator windings, $r_s$, $r_r$, $l_r$ and $l_m$: constants inherent to the induction motor, $\theta$: rotor rotating angle (radians) of the induction motor, and $I_2$: instructed rotor current (ampere) corresponding to the torque instruction.

3. A torque control system of an induction motor having m phase stator windings and P poles, comprising means for producing a predetermined torque instruction, and means responsive to said torque instruction for generating and applying a phase n voltage $V_{ns}$ expressed by the following equation to the stator windings of said induction motor to cause it to produce a torque corresponding to said torque instruction, $$\left(l_m I_o \frac{d\phi}{dt} + r_s I_2\right) \sin\left(\phi - \frac{2(n-1)}{m}\pi\right)$$

where $$\phi = \frac{P}{2}\theta + \frac{r_r}{l_r}\int\frac{I_2}{I_o}dt,$$

$I_o = I_{oB}$ when $I_{oB} \leq I_{oN}$,
$I_o = I_{oN}$ when $I_{oB} > I_{oN}$,
$I_{oB}$: constant base exciting current (ampere), $$I_{oN} = \frac{1}{r_s^2 + l_m^2\left(\frac{d\theta}{dt}\right)^2} \times \left[-l_m\left(\frac{l_m}{l_r}r_r + r_s\right)I_{2m}\left|\frac{d\theta}{dt}\right| + \sqrt{\left\{l_m\left(\frac{l_m}{l_r}r_r + r_s\right)I_{2m}\frac{d\theta}{dt}\right\}^2 + \left\{r_s^2 + l_m^2\left(\frac{d\theta}{dt}\right)^2\right\}\left\{E^2 - \left(\frac{l_m}{l_r}r_r + r_s\right)^2 I_{2m}^2 - \alpha^2\right\}}\right],$$

$r_s$, $r_r$, $l_r$ and $l_m$: constants inherent to the induction motor, $\theta$: rotor rotating angle (radian) of the induction motor, $I_{2m}$: maximum rotor current (ampere), $E$: maximumm permissible voltage (volt) of the stator voltage generating means, $\alpha$: constant (volt), $$I_2 = \frac{l_r}{K_T l_m^2 I_o} T_e \text{ (ampere), and}$$

$K_T$: constant.

4. A torque control system of an induction motor having m phase stator windings and P poles, comprising means for producing a predetermined torque instruction, means responsive to said torque instruction for generating and applying a phase n voltage $V_{ns}$ expressed by the following equation to the stator windings of said induction motor to cause it to produce a torque $T_e$ corresponding to said torque instruction $$V_{ns} = \sqrt{\left\{r_s I_o + \left(l_m + l_r\frac{r_s}{r_r}\right)\frac{dI_o}{dt}\right\}^2 + \left(l_m I_o\frac{d\phi}{dt} + r_s I_2\right)^2} \cos\left(\phi - \frac{2(n-1)}{m}\pi\right) \tag{1}$$

and means for controlling $V_o$ in the following equation (2) so as to make said phase voltage to be equal to a permissible maximum value when said phase voltage exceeds said permissible maximum value, $$V_{ns} = \sqrt{\left\{r_s I_o + \left(l_m + l_r\frac{r_s}{r_r}\right)\frac{dI_o}{dt}\right\}^2 + \left(l_m I_o\frac{d\phi}{dt} + r_s I_2\right)^2} \cos\left(\phi - \frac{2(n-1)}{m}\pi\right) + V_o \tag{2}$$

$$V_{ns} = \left\{r_s I_o + \left(l_m + l_r\frac{r_s}{r_r}\right)\frac{dI_o}{dt}\right\} \cos\left(\phi - \frac{2(n-1)}{m}\pi\right) -$$

where $$\phi = \frac{P}{2}\theta + \frac{r_r}{l_r}\int \frac{I_2}{I_o} dt \text{ (radian)},$$

$I_o$: variable exciting current (ampere) and
  $I_o = I_{oB}$ when $I_{oB} \leq I_{oN}$
  $I_o = i_{oN}$ when $I_{oB} > I_{oN}$,
$I_{oB}$: constant base exciting current (ampere), $$I_{oN} = \frac{1}{r_s^2 + l_m^2\left(\frac{d\theta}{dt}\right)^2} \times \left[-l_m\left(\frac{l_m}{l_r}r_r + r_s\right)I_{2m}\left|\frac{d\theta}{dt}\right| + \sqrt{\left\{l_m\left(\frac{l_m}{l_r}r_r + r_s\right)I_{2m}\frac{d\theta}{dt}\right\}^2 + \left\{r_s^2 + l_m^2\left(\frac{d\theta}{dt}\right)^2\right\}\left\{\frac{4}{3}E^2 - \left(\frac{l_m}{l_r}r_r + r_s\right)^2 I_{2m} - a^2\right\}}\right],$$

$r_s$, $r_r$, $l_r$ and $l_m$: constants inherent to the induction motor,
$\theta$: rotor rotational angle (radian) of the induction motor,
$I_{2m}$: maximum rotor current (ampere),
E: permissible maximum value of $V_{ns}$ (volt),
a: constant (voltage), $$I_2: \frac{l_r}{K_T l_m^2 I_o} T_e, \text{ and}$$

$K_T$: constant.

5. The apparatus according to claim 1, 2, 3 or 4 which further comprises means for producing a speed instruction, and speed control means for rendering said torque $T_e$ produced by said motor to correspond to a speed error obtained by subtracting an actual speed of said motor from said speed instruction so as to control the actual speed of said induction motor to be equal to said speed instruction.

6. The apparatus according to claim 5 which further comprises means for producing a position instruction which operates to make said speed instruction to correspond to a position error obtained by subtracting an actual rotor position of said induction motor from said position instruction so as to make equal the rotor position to said position instruction.

7. The apparatus according to claim 1, 2, 3 or 4 which further comprises a position instruction which operates to make said torque produced by said induction motor to correspond to a position error obtained by subtracting an actual rotor position of said induction motor from said position instruction so as to make equal the rotor position equal to said position instruction.

* * * * *